(12) United States Patent
Wang

(10) Patent No.: US 8,176,029 B2
(45) Date of Patent: May 8, 2012

(54) COMPOSITE DISPLAY METHOD AND SYSTEM FOR SEARCH ENGINE OF SAME RESOURCE INFORMATION BASED ON DEGREE OF ATTENTION

(76) Inventor: Dong Wang, Beijing (CN)

( * ) Notice: Subject to any disclaimer, the term of this patent is extended or adjusted under 35 U.S.C. 154(b) by 534 days.

(21) Appl. No.: 12/279,949

(22) PCT Filed: Feb. 2, 2007

(86) PCT No.: PCT/CN2007/000370
§ 371 (c)(1),
(2), (4) Date: Aug. 19, 2008

(87) PCT Pub. No.: WO2007/095834
PCT Pub. Date: Aug. 30, 2007

(65) Prior Publication Data
US 2009/0094213 A1    Apr. 9, 2009

(30) Foreign Application Priority Data

Feb. 22, 2006    (CN) .......................... 2006 1 0007905

(51) Int. Cl.
*G06F 7/00* (2006.01)
*G06F 17/30* (2006.01)
(52) U.S. Cl. ....................................... 707/706; 707/770
(58) Field of Classification Search ........... 707/600–831
See application file for complete search history.

(56) References Cited

U.S. PATENT DOCUMENTS

| | | | | |
|---|---|---|---|---|
| 7,644,072 B2* | 1/2010 | Budzik et al. | ................. | 707/748 |
| 7,822,705 B2* | 10/2010 | Xia | ............................... | 707/603 |
| 2005/0105513 A1* | 5/2005 | Sullivan et al. | ............... | 370/352 |
| 2007/0185865 A1* | 8/2007 | Budzik et al. | ..................... | 707/5 |

OTHER PUBLICATIONS

Baowen Xu et al., Result integration in a meta Web search engine, 2002, IEEE, 154-158.*

* cited by examiner

*Primary Examiner* — Jean B Fleurantin
(74) *Attorney, Agent, or Firm* — McNeely, Hare & War, LLP; Kevin J. McNeely

(57) ABSTRACT

A composite display method and system for a search engine of same resource information based on the degree of attention. The search engine finds all the target stations that correspond to some conditions as original results. The original results are combined to a title search result depending on the content, quality, and information of a user, etc. The title search result is displayed on the browser of the user as a search result, and can be expanded when being viewed. The system uses a statistic server and network browser, and all operations of user are converted into the degree of attention for the web pages. The grade value for the degree of attention is sent to the statistic server as the standard of arrangement for the presentation of content and quality. Another method capable of judging the status of the user automatically and providing the suitable web page is also disclosed.

16 Claims, 12 Drawing Sheets

COMPOSITE DISPLAY METHOD AND SYSTEM FOR SEARCH ENGINE OF SAME RESOURCE INFORMATION BASED ON DEGREE OF ATTENTION

CROSS-REFERENCE TO RELATED APPLICATIONS

This utility patent application claims priority to Chinese patent application no. 200610007905.7 filed on Feb. 22, 2006 and international patent application no. PCT/CN2007/000370 filed on Feb. 2, 2007, which are incorporated by reference herein.

FIELD OF THE INVENTION

The present invention relates to computer network and internet technology, especially, the search engine technology by using computer to provide the searching service on internet or intranet. The present invention also relates to a system of obtaining the user's attention degree to the webpage as well as website content and style self-adapting device and method.

BACKGROUND OF THE INVENTION

At present, there are a large number of "same (or similar) source webpage or network service". For example, 1. a large number of copied articles, opinions and information webpage by the same person or organization; 2. a large number of copied news webpage gathered (or issued) by the same person or organization; 3. Republication of the topic statement by the same person or organization in BBS forums; 5. multimedia files in different data formats and compression ratios generated by the same person or organization; 6. executable programs, data, design documents generated by the same person or organization; 7. widely copied information generated in other means. All of these "the same (or similar) source webpage or network service" will be listed in the search results of the current search engine, which occupy a lot of space but have the same content. Thus, it is inconvenient for the inquirer to get what he wants.

At present, the click flow and stay time are used to evaluate the popular level of the webpage in various search engine and webpage ranking service systems. The methods are generally as follows: 1. search engine category: calculating the popular level of webpage depending on the click for the search result, e.g., Google and Baidu. 2. Alexa website rank category: sending the user's click and stay time on the webpage to the server depending on the toolbar software embedded in the browser (the parameters include the current URL and webpage opening time), but other assessment methods are not included. The working principle of Alexa may refer to:

http://www.singtaonet.com/it/it_sp/t20051110_43674.html, http://www.people.com.cn/GB/it/8219/41552/41597/3109586.html, At present, various websites can be classified as follows:

Category 1: Websites having the same content and style for all users at the same time (For example, news website).

Category 2: Websites displaying different styles and contents according to the users' settings (For example, news website of Google).

However, none of these websites could provide different display style and content in real time according to the users' different states.

SUMMARY OF THE INVENTION

To overcome the above deficiencies, the present invention provides a searching method, which could aggregate all the search results having the same use value for the inquirer because of the same content into only one record, that is, "title search result". Then it allows users to open and browse the other results according to their needs, thus automatically dispersing the hyperlink click of "title search result" to these WebPages to avoid the paralysis caused by the overload of target server owing to being clicked frequently. The present invention also provides a system for using the website browser, which can cooperate with the Statistical Server, to convert all of the operation from the user to the quality factor (PageFocus) for this webpage, and then send it back the statistical server as the grade of the attention-degree of webpage for page rank. The present invention also provides a method for providing different display styles and contents to users in different states at the same time, same website, even the same page by using various available information, which is helpful for judging the user's state and environment he/she stays in.

To accomplish the above-mentioned purpose, a composite display method for a search engine of same resource information, comprising the following steps:

(1) visiting a search engine via a web browser or application software, and inputting keywords to be searched by a inquirer;

(2) finding all target stations that correspond to some conditions as original search results by the search engine;

(3) searching for some account information of power purchasers of title search results via "same-source information processing module" and combining it with other judging rules to choose from the original search results as the object of title search results;

(4) only regarding the title search result selected as the search results to show the inquirer via the search engine web server or application server, and providing the inquirer for a button with meanings of opened details and other information;

(5) pushing a corresponding button by the inquirer, and then displaying the original search results found in Step (2) by the search engine to the inquirer.

"Same-source information processing module" consists of many "same-source information processing modules" (of the corresponding information category), for example, "same-source webpage processing module", "same-source multimedia processing module", "same-source picture processing module", "same-source document processing module", "same-source software processing module", "same-source data or database processing module", "same-source GIS processing module", "same-value network service processing module", "same-value commercial information processing module" etc.

The "same-source information processing module" includes the following steps:

(1) judging categories of information received by a network searcher via "information category judging module";

(2) concentrating information of the same category and sending it to the "same-source information processing module" of the corresponding information category;

(3) archiving the searched information processed by "same-source information processing module" (of the corresponding information category) into "non-same-source information database" (of the corresponding information category) or "same-source information database" (of the corresponding information category);

(4) publishing "non-same-source information database" (of the corresponding information) and "same-source information database" (of the corresponding information) onto the web server via system for searching of inquirers. Also providing directly searching services based on the dynamic webpages to the inquirer according to these two databases as for another implementation method.

The steps of processing the webpage information by the "same-source webpage processing module" are as follows:

(1) firstly judging whether the keywords have recently been searched by other users or not by the decision device whose search results have been published on the web server when the search engine partially receives the keywords to be searched; if it has been searched and the results have been published on the web server of search engine's search result, and then directly return to the search results, in which the webpage having the same source has already been aggregated into one search result; after clicking the button of "same-source webpage", another search result webpage including all search results may be picked up on the web server of search engine's search result, and then the whole searching process is finished;

(2) if the decision device whose search results have been published on web server judges the keywords have not been searched recently by other users, when the search engine partially receives the keywords to be searched, and no corresponding search results has been published on the web server of the search engine's search result; then A. initiating the "webpage searcher" to search "non-same-source webpage result database" and "same-source webpage results database" to find out the address of webpage in accordance with the search keywords, and obtain contents of the webpage;

B. returning the result of "no matching webpage" to the inquirer, if no address of webpage in accordance with the search keywords is found in "non-same-source webpage result database" and "same-source webpage result database" of "webpage searcher", and adding the search keywords to next new task of updating "non-same-source webpage result database" and "same-source webpage result database"; if an address of webpage in accordance with conditions is found during the updating process, and then selecting and putting into "non-same-source webpage result database" or "same-source webpage result database" depending on whether they have the same-source webpage; and thus, the result will be obtained if another person searches for the same keywords again;

(3) decomposing contents of webpage and objects of hyperlink by "webpage content separator" into the following types of multimedia, picture, text and hyperlink;

(4) generating judgment results by various content decision devices respectively:

A. generating "SMS (Same Media Score)" contained in the target webpage by "multimedia content decision device";

B. generating "SPS (Same Photo Score)" contained in the target webpage by "picture content decision device";

C. generating "STS (Same Text Score)" contained in the target webpage by "text content decision device";

D. generating "SHS (Same Hyperlink Score)" contained in the target webpage by "hyperlink content decision device";

(5) obtaining respectively "SMP" (same-source multimedia judging power), "SPP" (same-source photo judging power), "STP" (same-source text judging power) and "SHP" (same-source hyperlink judging power) from "same-source webpage judgment rule database" and multiplying them respectively with "SMS", "SPS", "STS" and "SHS" generated in Step (4);

(6) summing up the results of Step (5) to obtain the "SSS" (Same Source Score) of the webpage, wherein SSS= (SMS*SMP)+(SPS*SPP)+(STS*STP)+(SHS*SHP);

(7) judging whether the "SSS" of the webpage exceeds the threshold, if YES, then judging it as "same-source webpage" of other webpage; if NO, then judging it as "non-same-source webpage";

(8) putting the "non-same-source webpage" generated in Step (7) into "non-same-source webpage result database" through "non-same-source webpage processing module"; and putting the "same-source webpage" generated in Step (7) into the "same-source webpage result database" through the "same-source webpage processing module";

(9) generating a static webpage of search results dynamically by the "search result webpage publisher" in accordance with the content of "same-source webpage index database" and "non-same-source webpage index database", publishing them onto the "web server of search engine's search result", and then displaying them to the inquirer via a browser;

(10) displaying the results to the inquirer directly through a browser by using "dynamic webpage web server", for another implementation method of "Step (9)".

The steps of "same-source information processing module" are as follows:

(1) receiving some search keywords from an inquirer, and judging files or services to be required by the software according to the content and syntax of keywords;

(2) judging whether the contents to be searched have already been published on the web server or not, if the search results have been published on the "web server of search engine's search result", then returning directly to the search results, in which the multimedia access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the step 3;

(3) returning "no matching result" to the inquirer;

(4) adding the search keywords to next task of updating the "non-same-source information index database" and "same-source information index database", and periodically initiating the updating process of the two databases;

(5) updating processes of the "same-source information index database" and "non same-source information index database", comprising:

A. searching new target files or service entrances on the webpage by "searcher" and entering into the entrances by the software to obtain files or services;

B. judging whether the content of newfound information is the same as that of the current "same-source information index database" by the "content decision device", if "YES", then putting it into the category of the "same-source information index database" as a new element; if "NO", then judging whether it has the same content as that of the current "non-same-source information index database" by the "content decision device";

C. creating a new category for the current information and the same-source information having been stored in the "non-same-source information index database", and transferring all into the "same-source information index database", if "YES";

D. then creating a new category for the current information, and storing it into the "non-same-source information index database", if "NO";

(6) generating the static webpage of the search results dynamically by the "search result webpage publisher" according to the content of the "same-source webpage index database" and "non-same-source webpage index database", publishing them onto the "web server of search engine's search results", and then displaying them to the inquirer via a browser;

(7) displaying the results to the inquirer directly through a browser by using "dynamic webpage web server", for another implementation method of "Step (6)".

When processing documents by the "same-source information processing module", the updating process of "same-source information index database" and "non-same-source information index database" is as follows:

(1) searching new document files or hyperlink entrances in the webpage by "document searcher", and entering into the entrances by the software to obtain files or services;

(2) judging whether the content of the newfound document is the same as that of the current "same-source document index database" by the "text content decision device" and "picture content decision device"; if "YES", then putting it into the category of "same-source document index database" as a new element; if "NO", then judging whether it has the same content as that of the current "non-same-source document index database" by the "document content decision device";

(3) creating a new category for the current documents and the same-source documents having been stored in the "non-same-source document index database", and transferring all to the "same-source document index database" if "YES"; if "NO", then creating a new category for the current documents, and storing them in the "non-same-source document index database".

The related "content decision device module" includes the following steps:

(1) receiving "judged objects", which may receiving the multimedia from multiple sources, and recording the quantity of the judged objects as InputQuantity;

(2) finding out the vested comparable property of the judged objects, and recording the quantity of the judged objects having the same value on the current property as SameQuantity;

(3) inputting the "power" value of the current property during the process of judgment as Power;

(4) calculating the anastomosis degree of all "judged objects" on the current property: PSame=SameQuantity*Power;

(5) returning to Step (1) and executing Steps (1)~(4) for next property to obtain the PSame of the property, until obtain the PSames of all properties;

(6) calculating and returning the degree value of the same content of the judged objects: SameMediaPower=the sum of all of PSames/InputQuantity.

When the content decision device module is "text content decision device", it includes the following steps:

(1) finding out the total length value of same words or sentences in the texts as SameLength;

(2) finding out the length value of the shortest inputted texts in the multiple inputted texts as MinLength;

(3) returning to the value of similarity degree of texts: SameTextPower=SameLength/MinLength.

When the "content decision device module" is "hyperlink content decision device", it includes the following steps:

(1) receiving the "judged objects", which are URL addresses of multiple hyperlinks;

(2) making statistics to the similarity degree of the "judged objects": SameURLPower=the quantity of URL addresses which have appeared in every group of hyperlinks;

(3) returning to the SameURLPower.

When the "content decision device module" is "commercial information content decision device", it includes the following steps:

(1) comparing whether the compared commercial information is the same products or services, if "NO", then returning to "inconsistency", if "YES", then entering into the Step (2);

(2) judging whether the compared commercial information has sensitivity to geography location or not, if "NO", then returning to the judging results of "consistency"; if "YES", then entering into the Step (3);

(3) judging whether the providers of involving in the compared commercial information is located in the same city or region, if "NO", then returning to the judging results of "inconsistency"; if "YES", then returning to the judging results of "consistency".

The implementation method selected by the "title search result" includes the following steps:

(1) calculating the probability value (PWn) that every "same-source search result" becomes "title search result" as PWn, $$PWn=TP*PageFocus/(RespDelay-K),$$

n: the number of the search result is n,
when the (RespDelay−K) is less than or equals to zero, (RespDelay−K) should be 1, PageFocus: the value of webpage attention degree, RespDelay: the response delay of webpage service, K: the constant of service response: the service delay to be less than the constant will not be found, for example, K is set as 50 msec., TP: the power of "title search result";

(2) summing up the probability power value (PWn) of the entire original "same-source search result", PWall is the power value of the entire probability;

(3) calculating the probability that every "same-source search result" becomes "title search result": Pn=PWn/Pwall;

(4) choosing "title search result" dynamically and randomly with visiting actions of the inquirer according to the probability of Pn value, and displaying it to the inquirer.

The calculating method for the probability power value (PWn) of "title search result" can also be:

$$PWn=(TP+PageFocus)/(RespDelay-K), \quad a.$$

or $$PWn=(TP+PageFocus)/RespDelay/K, \quad b.$$

or $$PWn=TP*PageFocus/RespDelay/K. \quad c.$$

The "same-source information processing module"

A. can be embedded in the search engine;

B. can be placed between "search engine" and "web server of search engine's search result";

C. can also be placed between the "search engine" and the searched website as a preconditioning module.

The button with meanings of opened details or other information can be controls of hyperlink or various software interface.

A system for obtaining the degree of attention PageFocus of webpage user, comprising "PageFocus network server", "PageFocus network browser" and "webpage score server".

The "PageFocus network server" includes "ID register server of PageFocus browser", "PageFocusAccServer", "online update server of PageFocus browser" and "data encrypting & decrypting module";

The "PageFocus network browser" comprises "PageFocus browser's ID register module", "PageFocus calculating module".

The working steps are as follows:

(1) having a worldwide unique ID mark when "PageFocus network browser" is installed, or initiatively searching for "ID register server of PageFocus browser" from a network to get a worldwide unique ID mark when using;

(2) transforming users' operation for browser and webpage as well as the characteristics of webpage contents into the "PageFocus" of webpage according to the power, and forming "PageFocus data packet" by "PageFocus network browser" having the conventional network browser, then transmitting it to the "PageFocusAccServer" of the search engine in an encryption manner via network protocol;

(3) accumulating the "PageFocus" score contained in it to the corresponding webpage by "PageFocusAccServer" after receiving the "PageFocus data packet" sent by every global "PageFocus network browser";

(4) treating the information of "PageFocus" of every global webpage contained in "PageFocusAccServer" in various methods to form the reference of webpage rank by the search engine, the reference of choosing "title search result" from the search results with the same contents, or publishing it directly out as services of "rank of webpage popular degree".

The "PageFocusAccServer" can record the score by the way of "logarithm" or "scientific counting".

The "PageFocus data packet" can be formed when the browser closes the webpage thoroughly or can be formed periodically, or can be formed when being accumulated to a certain score.

The "PageFocus" score are formed according to the power listed in the following table:

| Operations of the browser | Power | Note |
| --- | --- | --- |
| Opening a webpage | 1(or 1.1, 1.3, 1.5) | The user is interested in opening the webpage |
| Staying for less than 10 sec. in a webpage | −10(or 7, 8, 9) | A disgusting webpage |
| Staying for less than 30 sec. in a webpage | −3(or −5, −4, −2) | Without interest or very simple content. |
| Staying for less than 1 min in a webpage | −1(or −3, −2, −1.5) | Without interest or very simple content. |
| Staying for more than 1 min in a webpage | 3(or 1, 2, 5) | A common webpage browse |
| Staying for more than 5 min in a webpage | 5(or 3, 4, 5) | A more serious webpage browse |
| Speed of reading words | 100/speed of reading words | 1. "Speed of reading words" can be calculated by judging user's operating scope and frequency for keyboard, mouse wheel and "drag of scroll bar" as well as the font size of the webpage contents; 2. "Speed of reading words" = quantity of scrolled text/time interval of scrolling; 3. Unit of "speed of reading words" is words/sec.; 4. Note: reading at 100 words/1 sec. means careless, then gain 1 point; reading at 1 word/1 sec. means very careful, then gain 100 points. |
| The picture of the webpage is clicked, but the hyperlink of the picture points to another picture. | 3(or 1, 2, 4) | It means the picture may provide a "larger picture", and it may be the main content of the webpage, and the user's clicking means he/she wants to look at the larger one carefully. |
| The picture of the webpage is clicked, bud the hyperlink of the picture points to another webpage of the same website. | 1(or 0.1, 0.2, 0.9) | It may be an advertisment picture. |
| The picture of the webpage is clicked, but the hyperlink of the picture points to anther webpage of another website. | 0(or 0.1, 0.2, 0.3) | It may be an advertisement picture. |
| The hyperlink of the webpage is clicked, but the target is in the same directory with the current page. | 2(or 0.5, 1, 2.5) | It may be a serial webpage of the same article, both of the current webpage and the target webpage pointed by the clicked hyperlink can obtain scores of the "power", e.g.: "http:/www.yoogol.com/news/01.htm" and "http:/www.yoogol.com/news/02.htm" |
| The hyperlink of the webpage is clicked, but the target is a webpage of another website. | 0(or−0.5, −0.3, −0.1) | There is nothing to do with the current webpage. |
| The webpage content contains the words with the titles having the meaning of sequence numbers, such as: "1 2 3 4", and the target points to the hyperlink of webpage with the same URL directory. | N | The current webpage and the webpage with the title having the meaning of sequence numbers, such as: "1 2 3 4", and the webpage of its target pointing at the same URL directory are usually the pagination display of the same article; scores of any page of the article (including negative score) is the same as that of other pages, even if they have not been opened. |

-continued

| Operations of the browser | Power | Note |
|---|---|---|
| Using browsers by users and clicking a menu of the right key of mouse and voting: "voting −10 points" | PageFocus * 0% | 1. Using a menu of the right key of mouse for any parts of webpage in the browser, there are some menu options such as "Voting 10 points", "Voting 5 points", "Voting 1 point", "Voting −1 point", "Voting −5 points", and "Voting −10 points". |
| Using browsers by users and clicking a menu of the right key of mouse and voting: "Voting −5 points" | PageFocus * 10% | 2. When the menu of the right key is used by users to vote the background of the current webpage, the score of PageFocus = the score of PageFocus of the current webpage * power |
| Using browsers by users and clicking a menu of the right key of mouse and voting: "Voting −1 point" | PageFocus * 50% | 3. When the menu of the right key is used by users to vote various elements of the current webpage, the score of PageFocus of the webpage pointed by the hyperlink of the element = the score of PageFocus of the current webpage * power. |
| Using browsers by users and clicking a menu of the right key of mouse and voting: "Voting 10 points" | PageFocus * 10 | |
| Using browsers by users and clicking a menu of the right key of mouse and voting: "Voting 5 points" | PageFocus * 5 | |
| Using browsers by users and clicking a menu of the right key of mouse and voting: "Voting 1 point" | PageFocus * 1 | |

Notes:
1. The power values in the table are only some embodiments, the other values can also be used, falling into the scope of the present invention.
The calculating steps of the speed of reading words are as follows:
A. scrolling of mouse wheel: the speed of reading words = (the width of the display area/the width of the font) * the quantity of lines of scrolled words per time/time interval of scrolling;
B. flipping of keyboard: the speed of reading words = (the width of the display area/the width of the font) * the quantity of lines of words of flipping per time/time interval of flipping;
C. scrolling of window scroll bar: the speed of reading words = (the width of the display area/the width of the font) * the quantity of lines of scrolled words per time/time interval of scrolling.

The "PageFocus data packet" includes the score fields of "PageFocus browser ID", "WebPage URL" and "PageFocus".

When every webpage having "same-source webpage" involves in the process of providing the webpage rank by the search engine, the sum of PageFocus of every "same-source webpage" can be used as the basis of rank, that is, A. when the "title search result" of "same-source webpage" involves in the result rank of the search engine, the sum of PageFocus of every "same-source webpage" can be used as the basis of rank; B. when every webpage in the "same-source webpage" involves in the result rank of the search engine, the sum of PageFocus of every webpage in the affiliated "same-source webpage" can be used as the basis of rank.

A method of judging the status of the user automatically and providing the suitable style and contents of webpage, comprising the following steps:

(1) obtaining users' IP addresses in the visit protocol or IP protocol after receiving a request of the first visit to the webpage of the website by "system server cluster entrance";

(2) searching whether IP addresses are "workplace IP address" or "personal leisure IP address" according to "IP address property database", if it is "workplace IP address", then entering into Step (3); if it is "personal leisure IP address", then entering into Step (4);

(3) obtaining geography locations of "workplace IP address" and getting the local time of the geography area, if the time in the IP addresses' area belongs to the working time, then assigning the visit to the "working style server" of the server cluster to provide him webpage services suitable for the working place; otherwise, entering into the Step (4);

(4) Assigning visits to "personal leisure style server" to provide him with the webpage services suitable for personal and leisure status.

The above-mentioned solution provides the method and device, in which the search results having the same content and the same using value for the inquirer can be aggregated into one record, that is, "title search result", then open and look over other results according to the requirements. The design avoids the breakdown of the visited target server due to the frequent click for the "title search result", and automatically distributes the "title search results" to other search results. Besides the search engine, the present invention also relates to various network services of "multimedia", "document", "software", "software & hardware source code or designing file", "data or database", "information", such as the functions of file sharing, FTP service, P2P service and the like.

Transforming all operations of the user into the score of the webpage by using the website browser which can cooperate with the accounting server on the network, and sending it back the accounting server as the score of the attention degree of the webpage thereby to be the tool of the search engine rank.

By the self-adapting method of style and content of the website, the user can:

1. 9:00 am~18:00 am from Monday to Friday belongs to working times, persons in the working state want to view terse and relative precise styles and the content related to the working state.

2. 18:00 pm~9:00 am from Monday to Friday as well as the weekend belong to the leisure time, persons in the leisure status want to view vivid, fervor and leisure contents and styles.

3. persons in the workplace want to view terse and relative precise styles and the content related to the working state.

4. persons in entertainment and house want to view vivid, fervor and leisure styles and contents.

5. persons in other environment or state want to view styles and contents suitable for the environment or state they stay.

DETAILED DESCRIPTION OF THE INVENTION AND PREFERRED EMBODIMENTS

The present invention is further described together with the accompanying drawings.

Figure 1:
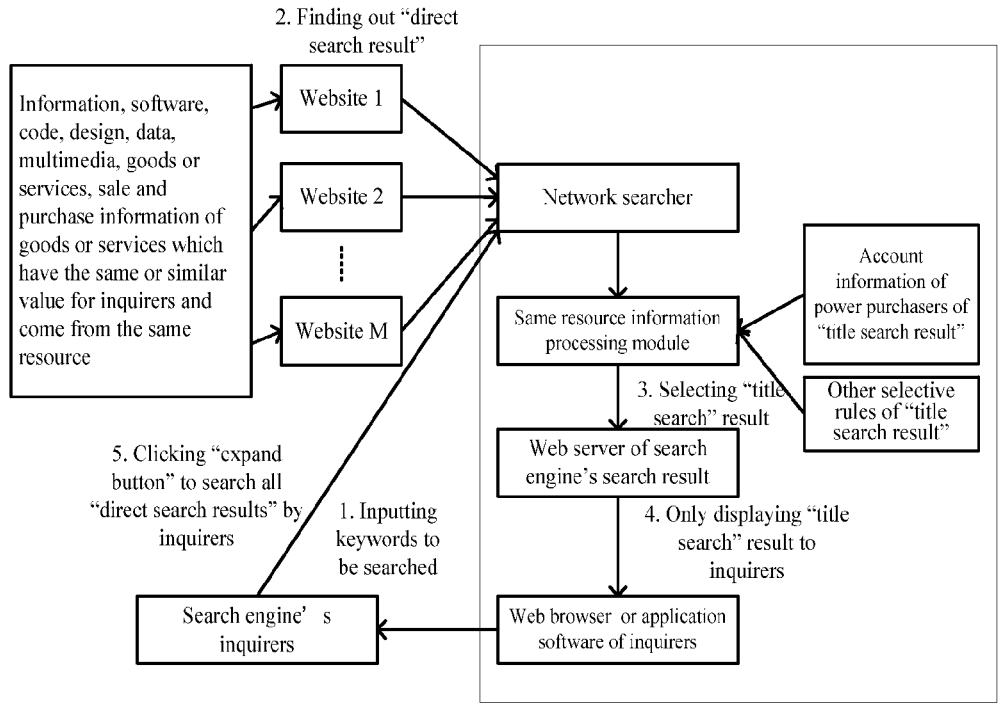
FIG. 1 is the block diagram of the working system of composite display method for search engine of same resource information based on degree of attention.

FIG. 1 is the block diagram of the working system of composite display method for search engine of same resource information based on degree of attention.

Step 1 visiting a search engine via a web browser or application software, and inputting keywords to be searched by a inquirer;

Step 2 finding all target stations that correspond to some conditions as original search results by the search engine;

Step 3 searching for some account information of power purchasers of title search results via "same-source information processing module" and combining it with other judging rules to choose from the original search results as the object of title search result; A. the "same-source information processing module" can be embedded in the search engine; B. the "same-source information processing module" can be placed between "search engine" and "web server of search engine's search result"; C. the "same-source information processing module" can also be placed between the "search engine" and the searched website as a preconditioning module.

Step 4 only regarding the title search result selected as the search results to show the inquirer via the search engine web server or application server, and providing the inquirer for a button with meanings of opened details and other information;

Step 5 pushing a corresponding button by the inquirer, and then displaying the original search results found in Step 2 by the search engine to the inquirer, only when an inquirer expects to open a "title searching result".

Figure 2:
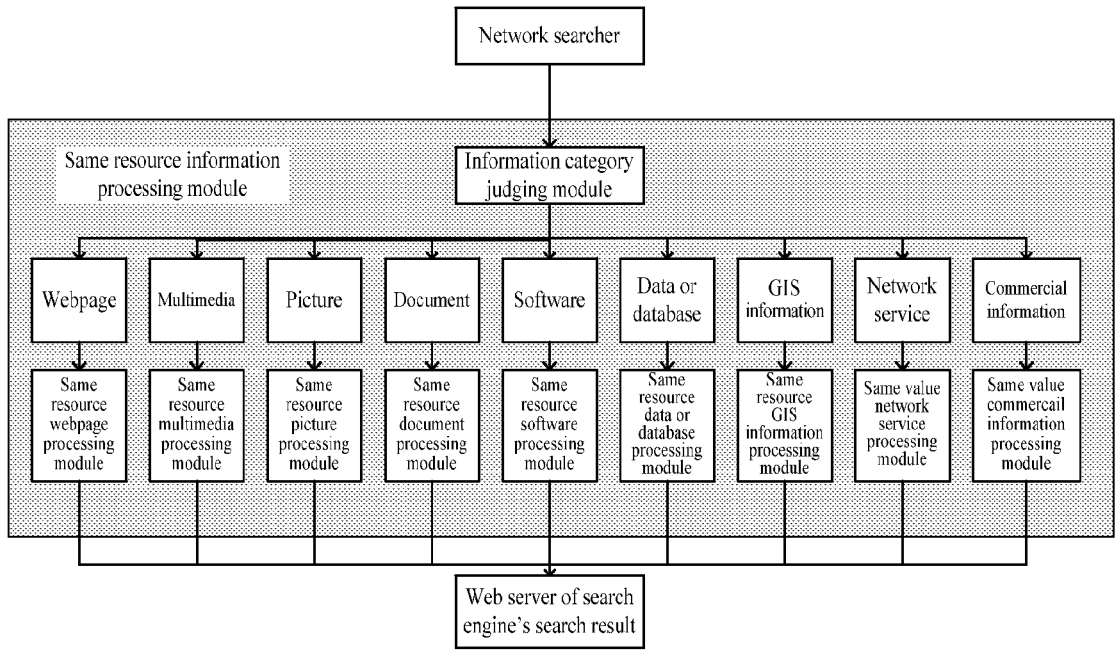
FIG. 2 is the block diagram of the internal structure of same-source information processing module.

FIG. 2 is the internal structure of the same-source information processing module. The definition of "same-source information processing module" is that 1) it is mainly used for judging whether the multiple nodes in a group of information nodes found out according to search keywords are repeated sites of one or multiple same-source information (these sites have the same searching or using value for the inquirer, and usually do not need to display directly all to the inquirer). Moreover, the repeated sites are aggregated into one search result and sent to the inquirer. The search results are displayed only when the inquirers need the other same-value sites. 2) "Same-source information processing module" is different from the existing search engine, which is mainly concentrated on the webpage searching, besides processing the "html webpage", it also may process all kinds of "multimedia", "document", "software", "software & hardware source code or designing document", "data or database", "information", such as file sharing, FTP service, P2P service, and the like.

The "same-source information processing module" adapts a modular structure, which could gradually develop and implement each of these modules according to the requirements and has expansion capabilities, and simultaneously each module could also further enhance accuracies of automatic judgments, wherein comprising:

1. "Information category judgment module": judging the category of information and sending the same category of information to the corresponding information processing module, such as the following modules.

2. "Same-source webpage processing module": for judging and processing the searched webpage, which belong to the same source and have the same value for the inquirer, for example: the contents of Html, ASP, JSP, PHP and BBS forum.

3. "Same-source multimedia processing module": for judging and processing the searched multimedia files or network services, which belong to the same source and have the same value for the inquirer, for example: all kinds of video files such as .MP3, .AVI, .WMV, .MPEG, .WAV and .RM, as well as various video service access ports based on the streaming media technology.

4. "Same-source picture processing module": for judging and processing the pictures, which belong to the same source and have the same value for the inquirer, for example: .GIF, .JPG, .BMP and .PNG, etc.

5. "Same-source document processing module": for judging and processing the searched documents or network services, which belong to the same source and have the same value for the inquirer, for example: ".Doc", ".Txt", ".PDF", ".XLS" and ".PPT", etc.

6. "Same-source software processing module": capable of judging and processing the searched computer application software installation procedures, which belong to the same software by the same author, and they can be the same or different editions of software installation procedures adaptable to the same or different operating systems.

7. "Same-source data or database processing module": for judging and processing the searched data or database files in known formats, which belong to the same source or have the same content, and have the same value for the inquirer, for example: .DAT, .XLS, .MDF and .DBF, etc.

8. "Same-source GIS information processing module": for judging and processing the searched digital map files or services, which belong to the same source or have the same content and have the same value for the inquirer.

9. "Same-value network service processing module": for judging and processing the searched network services, which belong to the same source or have the same content, and have the same value for the inquirer, for example: FTP downloads services for the same file, IPTV services for synchronously rebroadcasting one TV station and email services for synchronously providing with 1 GB capacities.

10. "Same-value commercial information processing module": for judging and processing the searched commercial products or advertisement contents of services, which belong to the same source or have the same content, are in the same geographic or administrative region, have the same usage value for the inquirer and could be published through network, for example: the egg selling and haircut service information on the same street, the available telephone communication services in the same city.

"Information category judgment module" is mainly used for classifying categories of the searched information and sending them to the corresponding information processing modules.

There are main three kinds of the information sources processed by "information category judging module".

(1) Webpage forms: the information comes from the webpage contents of a website, and the hyperlinks pointing to a special file category are also contained in the webpage.

(2) Network service forms: it includes all kinds of network service entrances provided by network servers, for example: FTP service for downloading files, various seed services of P2P (Pear To Pear) software (such as BT download, eMule download), news server services etc. There are two approaches to obtain the network service entrances:

A. Network service available for the webpage: parsing the webpage contents to obtain the network service entrances.

B. Submit directly their network service entrances or contents to the search engine by the network service providers.

(3) Data or database forms: providing directly information input services to the network by the search engine and submitting their information by the network users, finally forming the data files or database forms information, from which the information will be chosen to satisfy requirements of the inquirers when the search engine is searched.

The judging method of information category of "webpage forms" is as follows:

The webpage per se can be directly outputted as "webpage" to "same-source webpage processing module". Furthermore, according to the webpage grammar (e.g., Html, Java, JSP, ASP, ASPX, PHP etc.), "information category judging module" can directly parse out the pointed file categories for grammars of "hyperlinks". The information categories can be distinguished based on different types of files.

The details are listed in the following table:

| Types of information | File types of hyperlinks |
| --- | --- |
| Multimedia | ".avi": video file, ".swf": flash file, ".wav": sound file, ".mp3": sound file, etc. |
| Picture | Picture formatted files: ".gif", ".bmp", ".jpg", ".png", etc. |
| Document | Document formatted files: ".txt", ".doc", ".xls", ".ppt", etc. |
| Software | Software installation files: ".exe", ".msi", etc. |
| GIS information | GIS files: ".tab" by Mapinfo Corp., etc. |
| Compressed file | Common compressed files: ".rar", . "zip", etc. |

EXAMPLES

1. If a webpage has the hyperlink, then we can judge that the target is "multimedia" type information.

2. If a webpage has the hyperlink, and only "song.mp3" is included thereinto after the target file is found and decompressed, then we can still judge the target is "multimedia" type information.

3. If a webpage has the hyperlink, the number of the files and catalog files, the title and size of each file thereinto are all the same as those of a certain known software installation disk after the target file is found and decompressed, and then we can judge the target is "software" type information.

The judging method of information type of "network service forms" is as follows:

Step 1: Visiting the service as a common user to obtain its contents.

Step 2: Classifying the obtained information according to the following table.

| Types of information | File types of hyperlinks |
| --- | --- |
| Multimedia | ".avi": video file, ".swf": Flash file, ".wav": sound file, ".mp3": sound file, etc. |
| Picture | Picture formatted files: ".gif", ".bmp", ".jpg", ".png", etc. |
| Document | Document formatted files: ".txt", ".doc", ".xls", ".ppt", etc. |
| Software | Software installation files: ".exe", ".msi", etc. |
| GIS information | GIS files: ".tab" by MapInfo Corp., etc. |
| Compressed file | Common compressed files: ".rar", ."zip", etc. |

Step 3: Classifying according to Step 2 after decompressing if the obtained file is a compressed formatted file.

The judging method of information type of "data or database forms" is as follows:

Step 1: Visiting the data file or database to obtain its contents.

Step 2: Performing directly Step 4 if the obtained information is a file from the data file or database.

Step 3: Visiting the path to obtain the target file if the obtained information is the path of file from the data file or database.

Step 4: Classifying the obtained information according to the following table.

| Types of information | File types of hyperlinks |
| --- | --- |
| Multimedia | ".avi": video file, ".swf": Flash file, ".wav": sound file, ".mp3": sound file, etc. |
| Picture | Picture formatted files: ".gif", ".bmp", ".jpg", ".png", etc. |
| Document | Document formatted files: ".txt", ".doc", ".xls", ".ppt", etc. |
| Software | Software installation files: ".exe", ".msi", etc. |
| GIS information | GIS files: ".tab" by MapInfo Corp., etc. |
| Compressed file | Common compressed files: ".rar", ."zip", etc. |

Step 5: Classifying according to Step 4 after decompressing if the obtained file is a compressed formatted file.

"Same-Source Webpage Processing Module"

Figure 3:
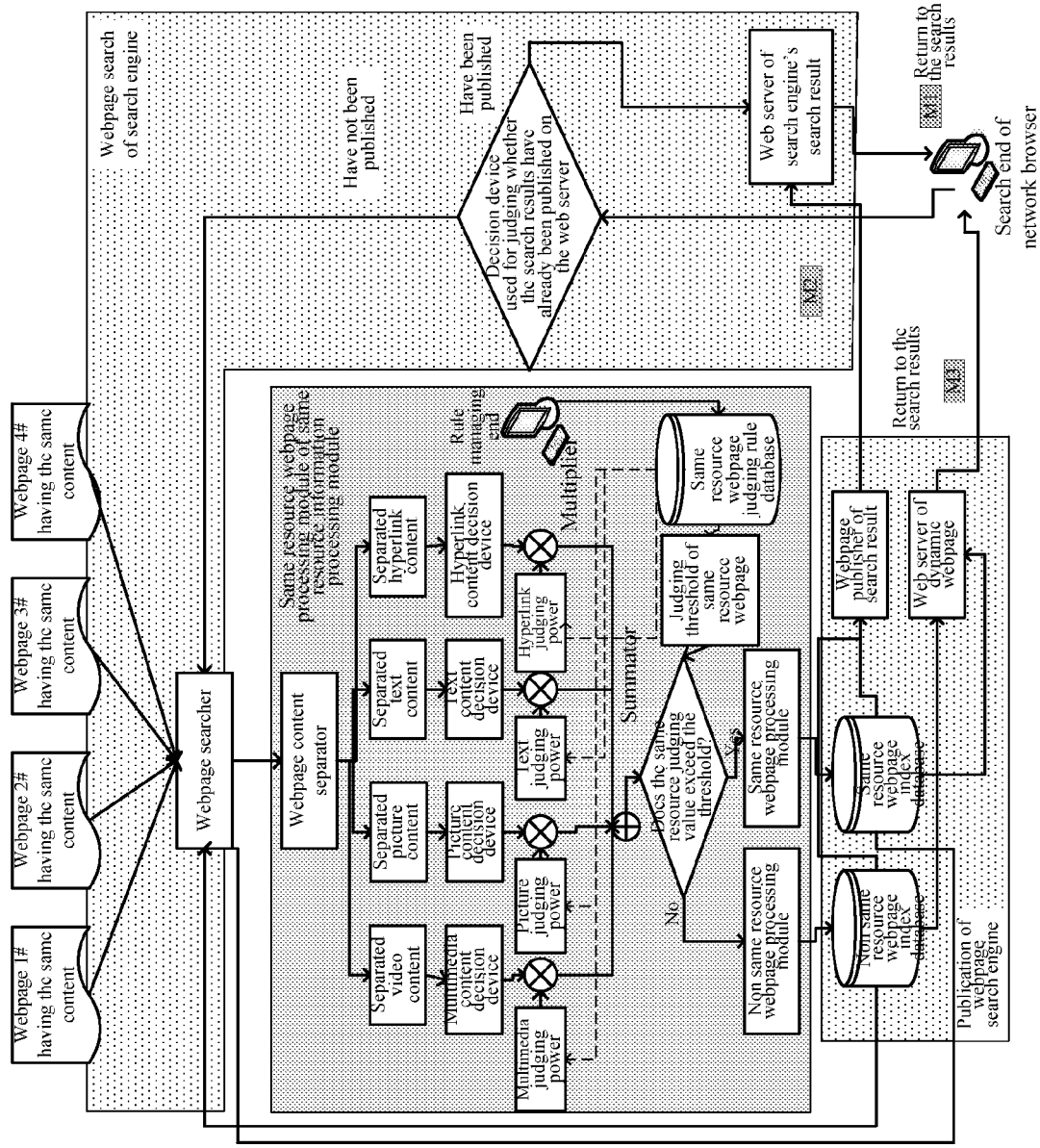
FIG. 3 is the flow chart of the same-source webpage processing module.

FIG. 3 is the flow chart of "same-source webpage processing module". The main functions of "same-source webpage processing module" are as follows: displaying the webpage in the form of a "title search result" to the inquirers, which are searched according to the search keywords and have the same main content. Moreover, all the search results having the same main contents can be picked up via an "expand" button. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source webpage result database" and "same-source webpage result database" by "same-source information processing module", and periodically published onto "search engine's search result web server" by "search result webpage publisher", to avoid the repeat calculation and reduce the wait time of the calculation.

The processing steps of "same-source information processing module" are as follows:

Step 1: firstly judging whether the keywords have recently been searched by other users or not by the decision device whose search results have been published on the web server when the search part of the search engine partially receives the keywords to be searched; if it has been searched and the results have been published on the web server of search engine's search result, and then directly return to the search results (refer to the mark of "M1" of the Figures), in which the webpage having the same source has already been aggregated into one search result; after clicking the button of "same-source webpage", another search result webpage including all search results may be picked up on the web server of search engine's search result, and then the whole searching process is finished.

Step 2: if the decision device whose search results have been published on web server judges the keywords have not been searched recently by other users, when the search engine partially receives the keywords to be searched, and no corresponding search results has been published on the web server of the search engine's search result. Then, Initiating the "webpage searcher" to search "non-same-source webpage result database" and "same-source webpage results database" to find out the address of webpage in accordance with the search keywords, and obtain contents of the webpage.

Returning the result of "no matching webpage" to the inquirer, if no address of webpage in accordance with the search keywords is found in "non-same-source webpage result database" and "same-source webpage result database" of "webpage searcher", and adding the search keywords to next new task of updating "non-same-source webpage result database" and "same-source webpage result database"; if an address of webpage in accordance with conditions is found during the updating process, and then selecting and putting into "non-same-source webpage result database" or "same-source webpage result database" depending on whether they have the same-source webpage; and thus, the result will be obtained if another person searches for the same keywords again.

Step 3: decomposing contents of webpage and objects of hyperlink by "webpage content separator" into the following types of multimedia, picture, text and hyperlink.

Step 4: generating judgment results by various content decision devices respectively:

A. generating "SMS (Same Media Score)" contained in the target webpage by "multimedia content decision device" (the multimedia includes: flash, video/audio file player or file services, IPTV/Live Broadcasting of Satellite/video-audio supervision/act/manual response and other real-time information player or file services, and other multimedia services).

B. generating "SPS (Same Photo Score)" contained in the target webpage by "picture content decision device".

C. generating "STS (Same Text Score)" contained in the target webpage by "text content decision device".

D. generating "SHS (Same Hyperlink Score)" contained in the target webpage by "hyperlink content decision device".

Step 5: obtaining respectively "SMP" (same-source multimedia judging power), "SPP" (same-source photo judging power), "STP" (same-source text judging power) and "SHP" (same-source hyperlink judging power) from "same-source webpage judgment rule database" and multiplying them respectively with "SMS", "SPS", "STS" and "SHS" generated in Step (4).

Step 6: summing up the results of Step (5) to obtain the "SSS" (Same Source Score) of the webpage, wherein SSS= (SMS*SMP)+(SPS*SPP)+(STS*STP)+(SHS*SHP).

Step 7: judging whether the "SSS" of the webpage exceeds the threshold, if YES, then judging it as "same-source webpage" of other webpage; if NO, then judging it as "non-same-source webpage".

Step 8: putting the "non-same-source webpage" generated in Step (7) into "non-same-source webpage result database" through "non-same-source webpage processing module"; and putting the "same-source webpage" generated in Step (7) into the "same-source webpage result database" through the "same-source webpage processing module".

Step 9: generating a static webpage of search results dynamically by the "search result webpage publisher" in accordance with the content of "same-source webpage result database" and "non-same-source webpage result database", publishing them onto the "web server of search engine's search result", and then displaying them to the inquirer via a browser (refer to the mark of "M2" of the Figures).

For another implementation method of "Step 9", displaying the results to the inquirer directly through a browser by using "dynamic webpage web server" (refer to the mark of "M3" of the Figures).

"Webpage content classifier" could be realized by software, parses directly out each type of content according to various webpage syntaxes such as "html syntax", "ASP/ASPX syntax", "PHP" and "JSP".

"Same-Source Multimedia Processing Module"

Figure 4:
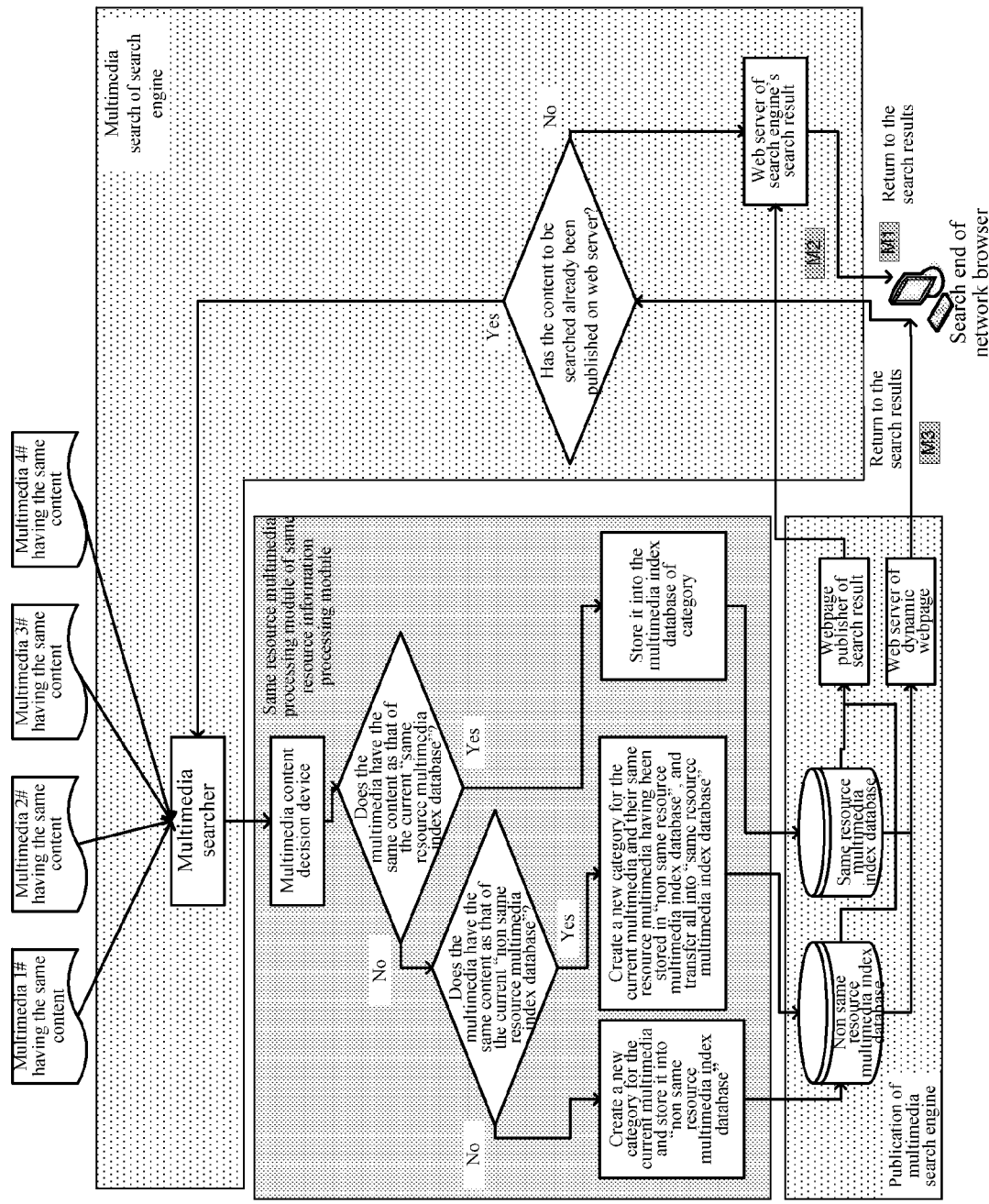
FIG. 4 is the flow chart of the same-source multimedia processing module.

FIG. 4 is the flow chart of "same-source multimedia processing module". As for the multimedia files or services according to search conditions, all "same-source multimedia processing module" adopts the way of hyperlinks in html webpage to provide for inquirers. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source multimedia index database" and "same-source multimedia index database" by "same-source information processing module", and periodically published onto "search engine's search result web server" by "search result webpage publisher", to avoid the repeat calculation and reduce the wait time of the calculation.

The processing steps of "same-source multimedia processing module" are as follows:

Step 1: receiving some search keywords from inquirers, and judging multimedia files or services to be required by the software according to the content and syntax of keywords (e.g., if ".MP3" is contained in the keywords, then it means that the content to be searched is .MP3 file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the multimedia access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the Step 3.

Step 3: returning no matching multimedia result to the inquirer.

Step 4: adding the search keywords to next task of updating "non-same-source multimedia index database" and "same-source multimedia index database", and periodically initiating the updating process of the two databases.

Step 5: updating processes of the "same-source multimedia index database" and "non same-source multimedia index database", comprising:
  A. searching new target files or service entrances on the webpage by "multimedia searcher" and entering into the entrances by the software to obtain the files or services.
  B. judging whether the content of newfound multimedia is the same as that of the current "same-source multimedia index database" by the "multimedia content decision device", if "YES", then putting it into the category of the "same-source multimedia index database" as a new element; if "NO", then judging whether it has the same content as that of the current "non-same-source multimedia index database" by the "multimedia content decision device";.
  C. creating a new category for the current multimedia and the same-source multimedia having been stored in the "non-same-source multimedia index database", and transferring all into the "same-source multimedia index database", if "YES"; if "NO", then creating a new category for the current multimedia, and storing it into the "non-same-source multimedia index database".

Step 6: generating the static webpage of the search results dynamically by the "search result webpage publisher" according to the content of the "same-source multimedia index database" and "non-same-source multimedia index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

"Same-Source Picture Processing Module"

Figure 5:
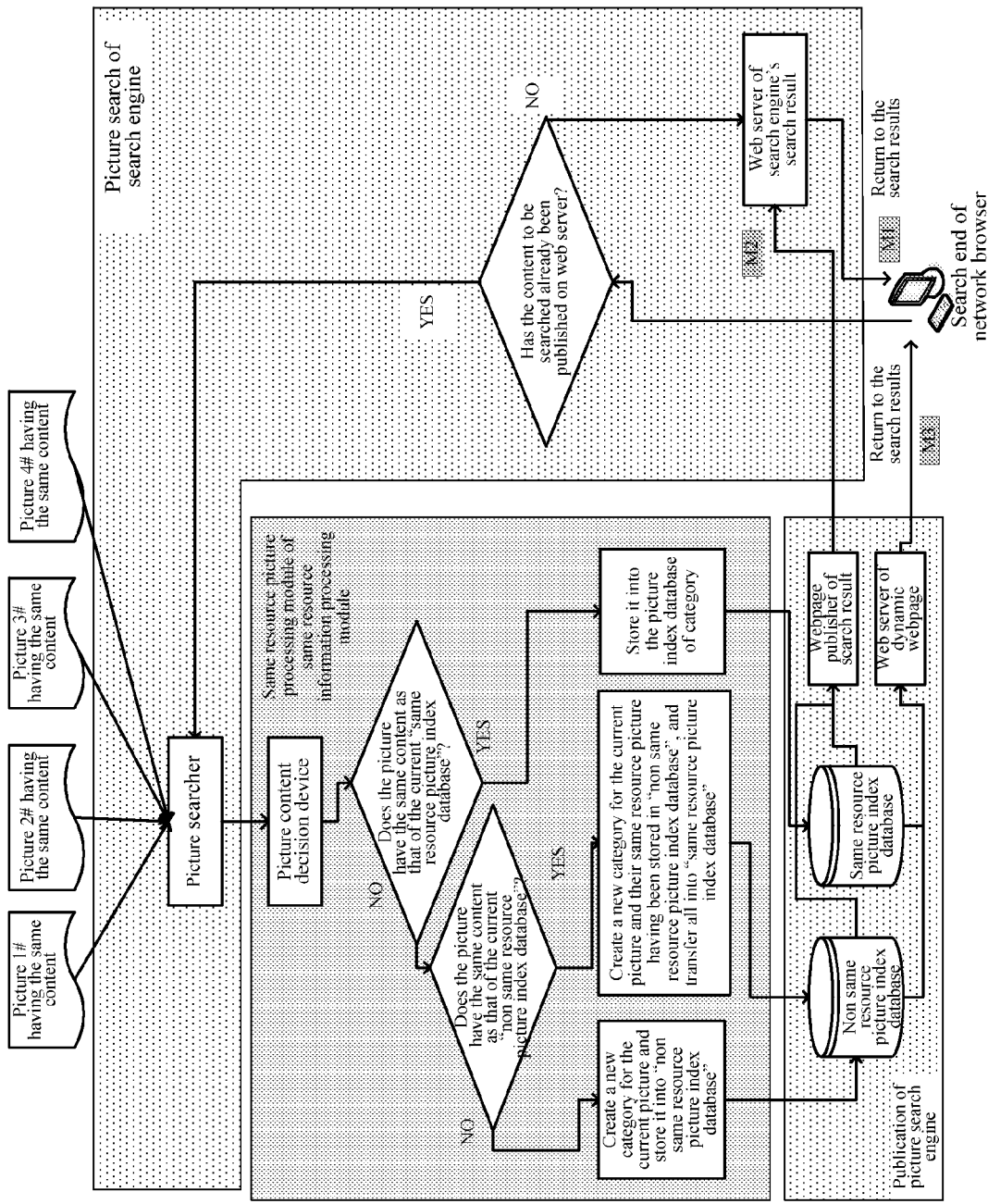
FIG. 5 is the flow chart of the same-source picture processing module.

FIG. 5 is the flow chart of "same-source picture processing module". As for the picture files or hyperlinks according to search conditions, all "same-source picture processing module" adopts the hyperlinks in html webpage to provide to the inquirer. In order to optimize the system performance, we adopt the following techniques:

Using webpage publish technique, the search results published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source picture index database" and "same-source picture index database" by "same-source information processing module", and periodically published onto "search engine's search result web server" by "search result webpage publisher", to avoid the repeat calculation and reduce the wait time of the calculation.

The processing steps of "same-source picture processing module" are as follows:

Step 1: receiving some search keywords from inquirers, and judging picture files or services to be required by the software according to the content and syntax of keywords (e.g., if ".JPG" is contained in the keywords, then it means that the content to be searched is .JPG file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the picture access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the Step 3.

Step 3: returning no matching picture result to the inquirer.

Step 4: adding the search keywords to next task of updating "non-same-source picture index database" and "same-source picture index database", and periodically initiating the updating process of the two databases.

Step 5: updating processes of the "same-source picture index database" and "non same-source picture index database", comprising:
  A. searching new target files or service entrances on the webpage by "picture searcher" and entering into the entrances by the software to obtain files or services.
  B. judging whether the content of newfound picture is the same as that of the current "same-source picture index database" by "picture content decision device", if "YES", then putting it into the category of "same-source picture index database" as a new element; if "NO", then judging whether it has the same content as that of the current "non-same-source picture index database" by "picture content decision device".
  C. creating a new category for the current picture and the same-source picture having been stored in the "non-same-source picture index database", and transferring all into the "same-source picture index database", if "YES"; if "NO", then creating a new category for the current picture, and storing it into the "non-same-source picture index database".

Step 6: generating the static webpage of the search results dynamically by the "search result webpage publisher" according to the content of the "same-source picture index database" and "non-same-source picture index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

"Same-Source Document Processing Module"

Figure 6:
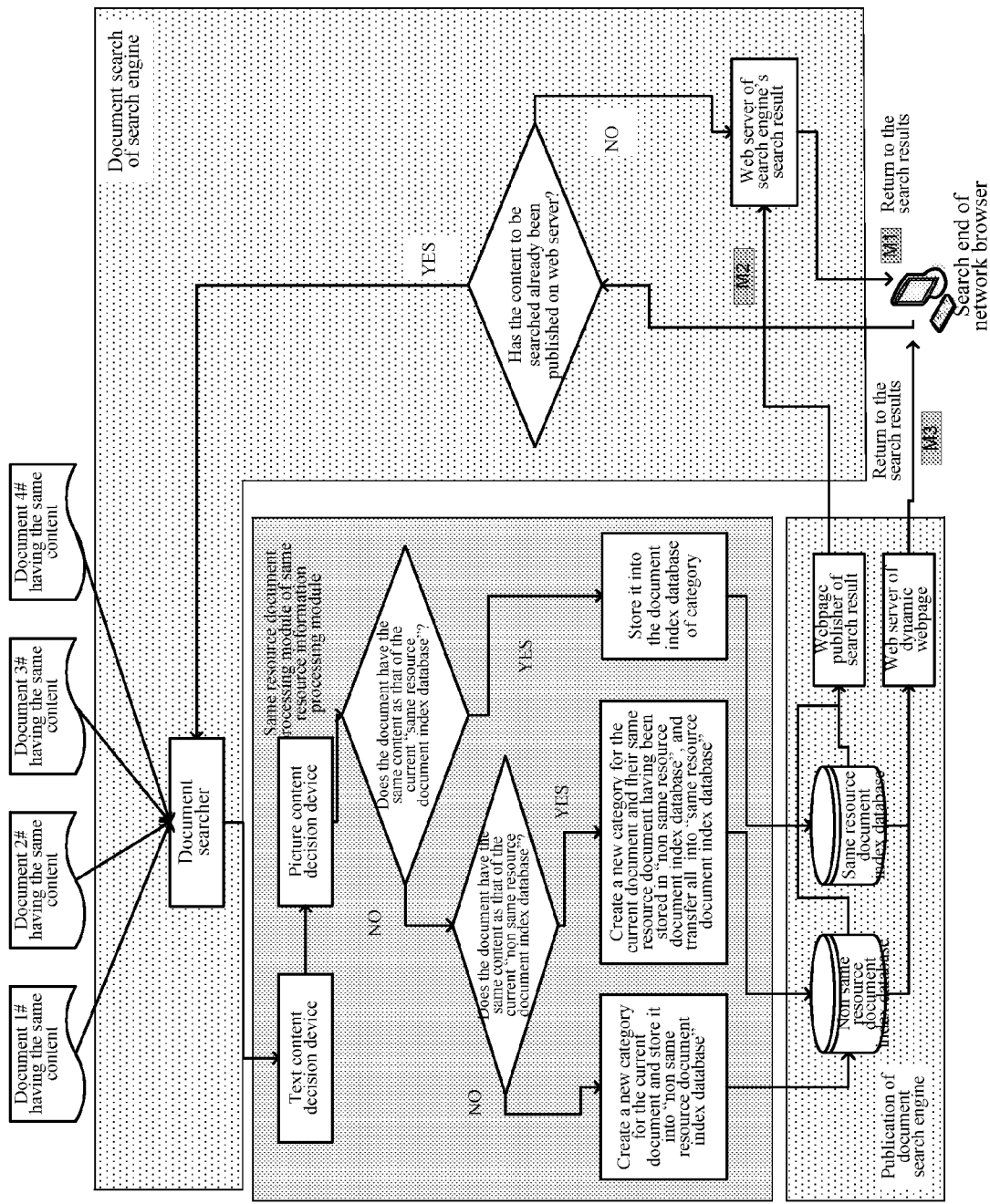
FIG. 6 is the flow chart of the same-source document processing module.

FIG. 6 is the flow chart of "same-source document processing module". The "same-source document processing module" supports common document formats, including: ".Txt", ".Doc", ".PPT", ".PDF", ".XLS", etc. As for the document files or hyperlinks according to search conditions, all "same-source document processing module" adopts the hyperlinks on html webpage to provide for the inquirer. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source document index database" and "same-source document index database" by "same-source information processing module", and periodically published onto "search engine's search result web server" by "search result webpage publisher", to avoid the repeat calculation and reduce the wait time of the calculation.

The processing steps of "same-source document processing module" are as follows:

Step 1: receiving some search keywords from inquirers, and judging document files or services to be required by the software according to the content and syntax of keywords (e.g., if ".PDF" is contained in the keywords, then it means that the content to be searched is .PDF file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the document access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the Step 3.

Step 3: returning no matching document result to the inquirer.

Step 4: adding the search keywords to next task of updating "non-same-source document index database" and "same-source document index database", and periodically initiating the updating process of the two databases.

Step 5: updating processes of the "same-source document index database" and "non same-source document index database", comprising:
  A. searching new target files or service entrances on the webpage by "document searcher" and entering into the entrances by the software to obtain the files or services.
  B. judging whether the content of newfound document is the same as that of the current "same-source document index database" by the "document content decision device", if "YES", then putting it into the category of the "same-source document index database" as a new element; if "NO", then judging whether it has the same content as that of the current "non-same-source document index database" by the "document content decision device".
  C. creating a new category for the current document and the same-source document having been stored in the "non-same-source document index database", and transferring all into the "same-source document index database", if "YES"; if "NO", then creating a new category for the current document, and storing it into the "non-same-source document index database".

Step 6: generating the static webpage of the search results dynamically by the "search result webpage publisher" according to the content of the "same-source document index database" and "non-same-source document index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

"Same-Source Software Processing Module"

Figure 7:
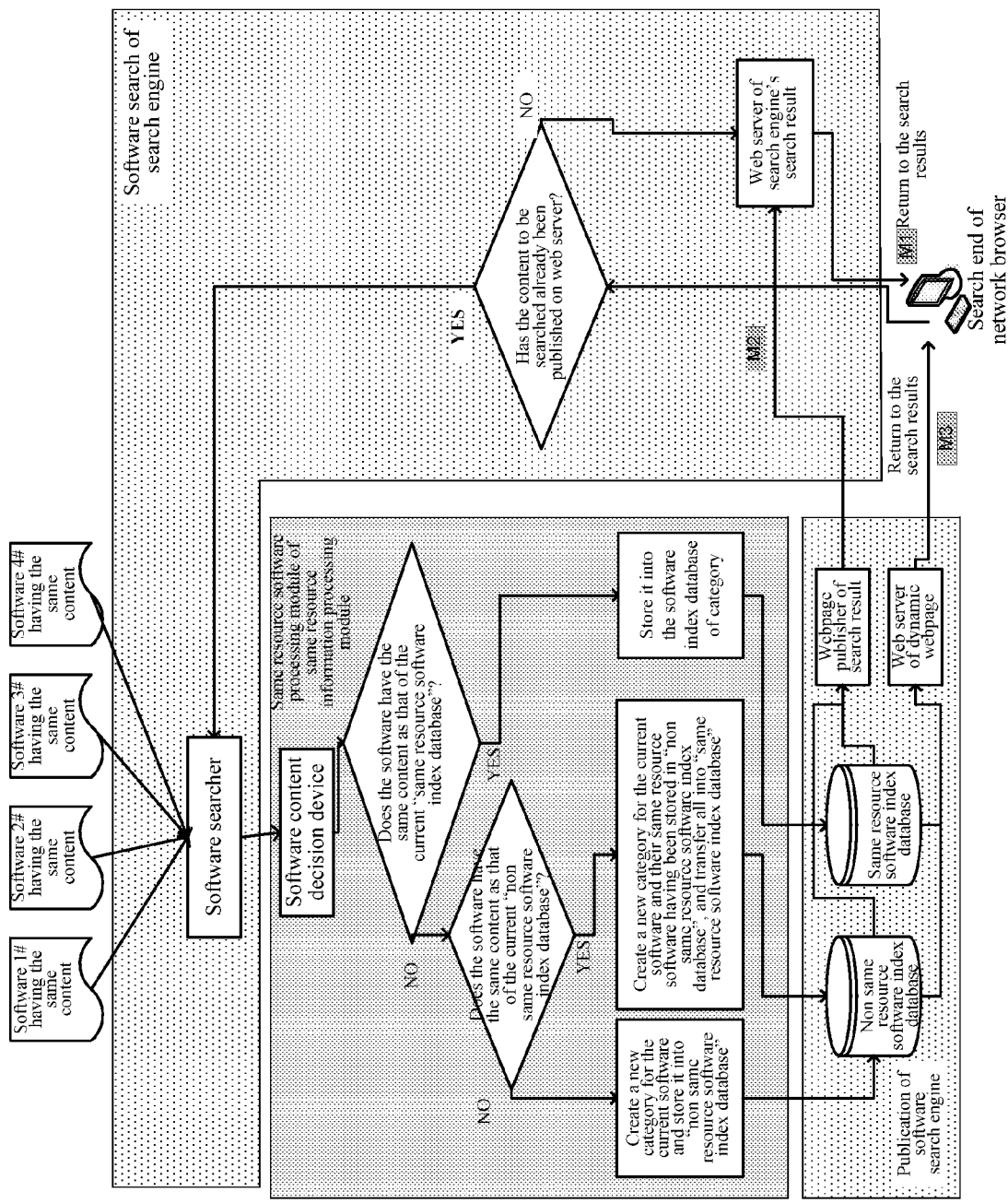
FIG. 7 is the flow chart of the same-source software processing module.

FIG. 7 is the flow chart of "same-source software processing module". As for the software files or hyperlinks according to search conditions, all "same-source software processing module" adopts the hyperlinks on html webpage to provide for the inquirer. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source software index database" and "same-source software index database" by "same-source information processing module", and periodically published onto "search engine's search result web server" by "search result webpage publisher", to avoid the repeat calculation and reduce the wait time of the calculation.

The processing steps of "same-source software processing module" are as follows:

Step 1: receiving some search keywords from inquirers, and judging software files or services to be required by the software according to the content and syntax of keywords (e.g., if ".EXE" is contained in the keywords, then it means that the content to be searched is .EXE file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the software access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the Step 3.

Step 3: returning no matching software result to the inquirer.

Step 4: adding the search keywords to next task of updating "non-same-source software index database" and "same-source software index database", and periodically initiating the updating process of the two databases.

Step 5: updating processes of the "same-source software index database" and "non same-source software index database", comprising:

A. searching new target files or service entrances on the webpage by "software searcher" and entering into the entrances by the software to obtain the files or services.

B. judging whether the content of newfound software is the same as that of the current "same-source software index database" by the "software content decision device", if "YES", then putting it into the category of the "same-source software index database" as a new element; if "NO", then judging whether it has the same content as that of the current "non-same-source software index database" by the "software content decision device".

C. creating a new category for the current software and the same-source software having been stored in the "non-same-source software index database", and transferring all into the "same-source software index database", if "YES"; if "NO", then creating a new category for the current software, and storing it into the "non-same-source software index database".

Step 6: generating the static webpage of the search results dynamically by the "search result webpage publisher" according to the content of the "same-source software index database" and "non-same-source software index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

"Same-Source Data or Database Processing Module"

Figure 8:
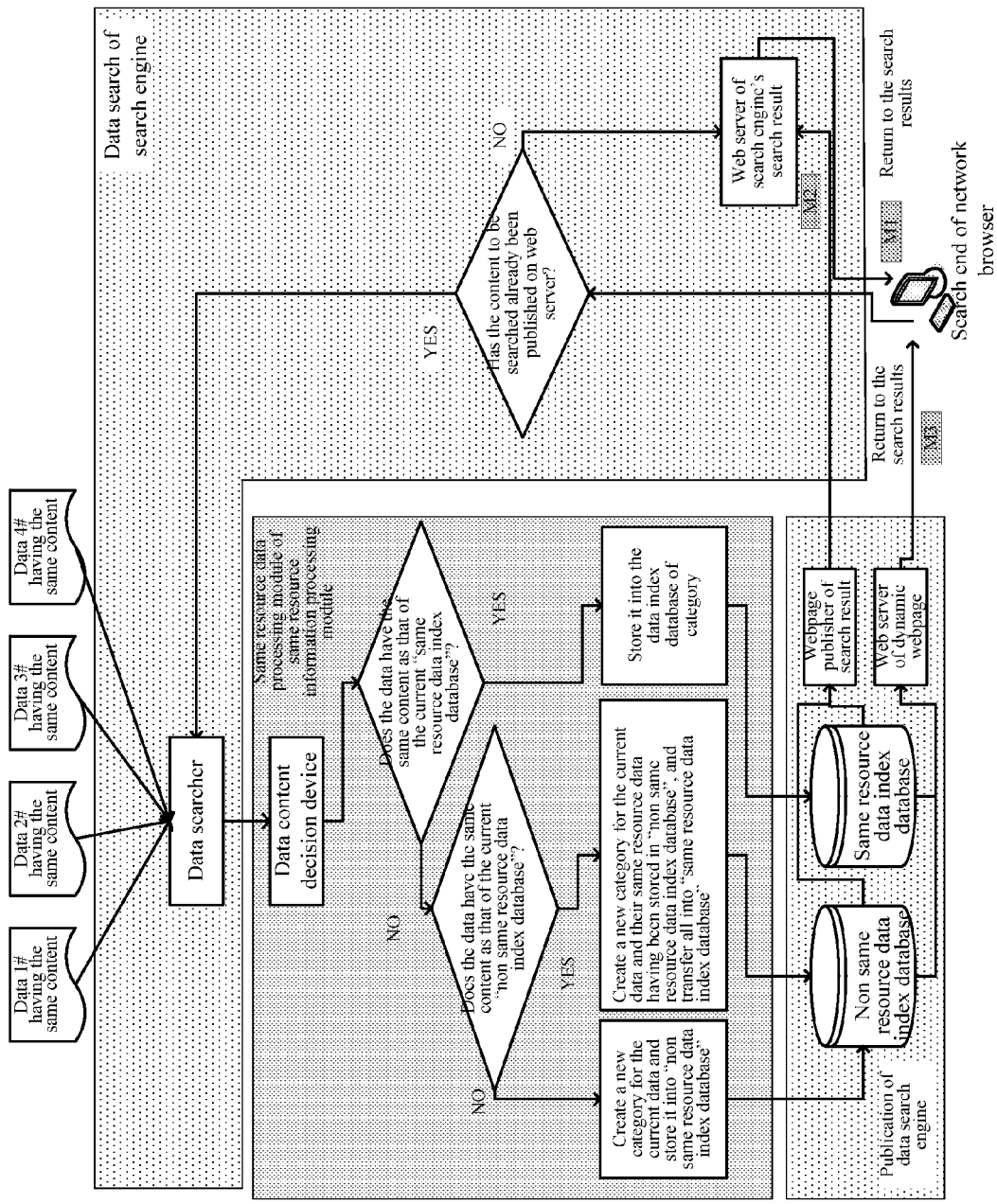
FIG. 8 is the flow chart of the same-source data or database processing module.

FIG. 8 is the flow chart of "same-source data or database processing module". As for the data or database files according to search conditions, all "same-source data processing module" adopts the hyperlinks on html webpage to provide for the inquirer. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source data or database index database" and "same-source data or database index database" by "same-source information processing module", and periodically published onto "search engine's search result web server" by "search result webpage publisher", to avoid the repeat calculation and reduce the wait time of the calculation.

The processing steps of "same-source data or database processing module" are as follows:

Step 1: receiving some search keywords from inquirers, and judging data or database files or services to be required by the data or database according to the content and syntax of keywords (e.g., if ".DBF" is contained in the keywords, then it means that the content to be searched is .DBF file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the data or database access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the Step 3.

Step 3: returning no matching data or database result to the inquirer.

Step 4: adding the search keywords to next task of updating "non-same-source data or database index database" and "same-source data or database index database", and periodically initiating the updating process of the two databases.

Step 5: updating processes of the "same-source data or database index database" and "non same-source data or database index database", comprising:

A. searching new target files or service entrances on the webpage by "data or database searcher" and entering into the entrances by the data or database to obtain the files or services.

B. judging whether the content of newfound data or database is the same as that of the current "same-source data or database index database" by the "data or database content decision device", if "YES", then putting it into the category of the "same-source data or database index database" as a new element; if "NO", then judging whether it has the same content as that of the current "non-same-source data or database index database" by the "data or database content decision device";.

C. creating a new category for the current data or database and the same-source data or database having been stored in the "non-same-source data or database index database", and transferring all into the "same-source data or database index database", if "YES"; if "NO", then creating a new category for the current data or database, and storing it into the "non-same-source data or database index database".

Step 6: generating the static webpage of the search results dynamically by the "search result webpage publisher" according to the content of the "same-source data or database index database" and "non-same-source data or database index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

"Same-Source GIS Information Processing Module"

Figure 9:
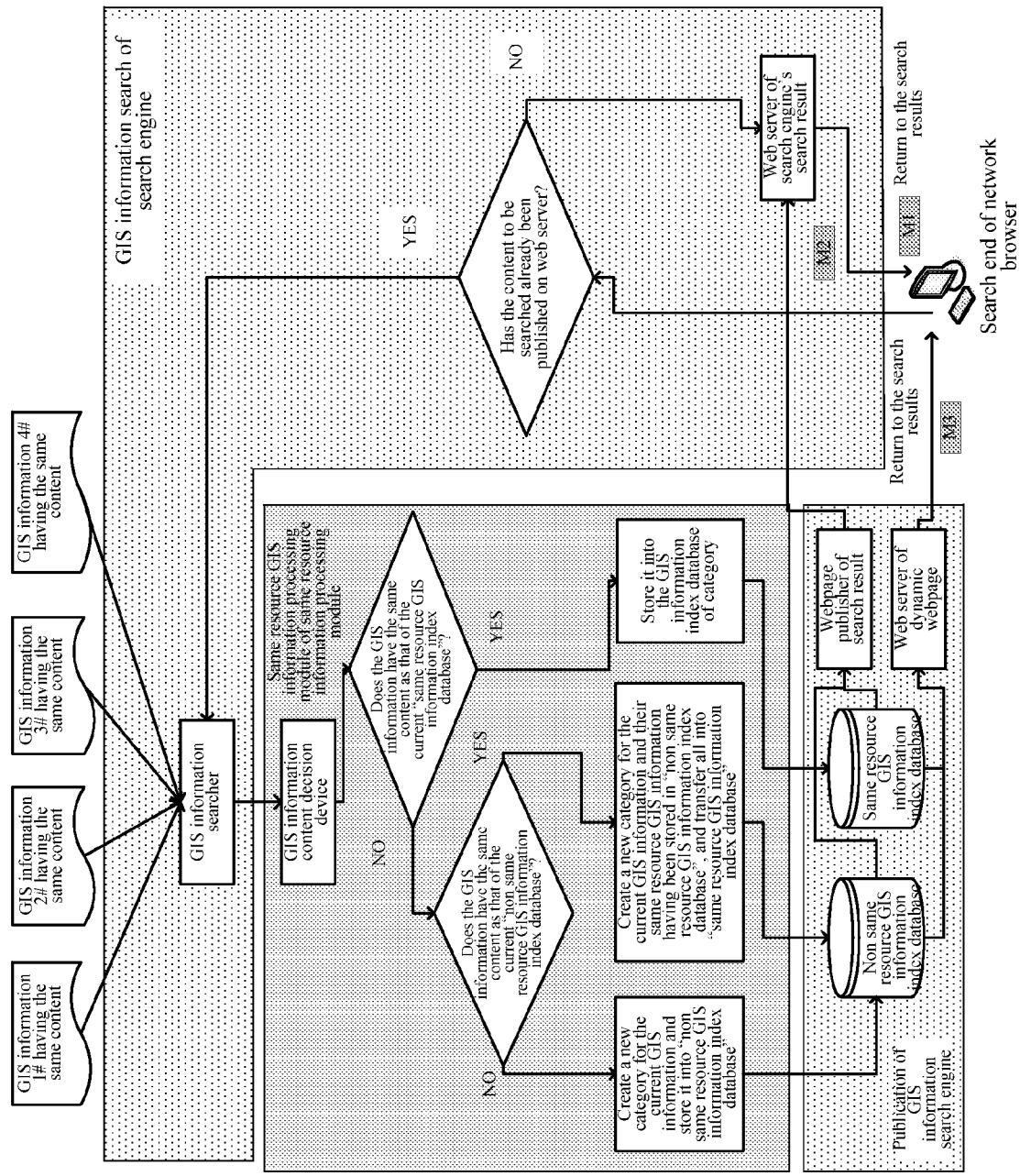
FIG. 9 is the flow chart of the same-source GIS information processing module.

FIG. 9 is the flow chart of the "same-source GIS information processing module". As for the GIS information files or hyperlinks according to search conditions, all "same-source GIS information processing module" adopts the hyperlinks on html webpage to provide for the inquirer. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-source GIS information index database" and "same-source GIS information index database" by "same-source information processing module", and periodically published onto "search engine's search result web server" by "search result webpage publisher", to avoid the repeat calculation and reduce the wait time of the calculation.

The processing steps of "same-source GIS information processing module" are as follows:

Step 1: receiving some search keywords from inquirers, and judging GIS information files or services to be required by the GIS information according to the content and syntax of keywords (e.g., if ".JPG" is contained in the keywords, then it means that the content to be searched is .JPG file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the GIS information access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the Step 3.

Step 3: returning no matching GIS information result to the inquirer.

Step 4: adding the search keywords to next task of updating "non-same-source GIS information index database" and "same-source GIS information index database", and periodically initiating the updating process of the two databases.

Step 5: updating processes of the "same-source GIS information index database" and "non same-source GIS information index database", comprising:
  A. searching new target files or service entrances on the webpage by "GIS information searcher" and entering into the entrances by the GIS information to obtain the files or services.
  B. judging whether the content of newfound GIS information is the same as that of the current "same-source GIS information index database" by the "GIS information content decision device", if "YES", then putting it into the category of the "same-source GIS information index database" as a new element; if "NO", then judging whether it has the same content as that of the current "non-same-source GIS information index database" by the "GIS information content decision device";.
  C. creating a new category for the current GIS information and the same-source GIS information having been stored in the "non-same-source GIS information index database", and transferring all into the "same-source GIS information index database", if "YES"; if "NO", then creating a new category for the current GIS information, and storing it into the "non-same-source GIS information index database".

Step 6: generating the static webpage of the search results dynamically by the "search result webpage publisher" according to the content of the "same-source GIS information index database" and "non-same-source GIS information index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

"Same-Value Network Service Processing Module"

Figure 10:
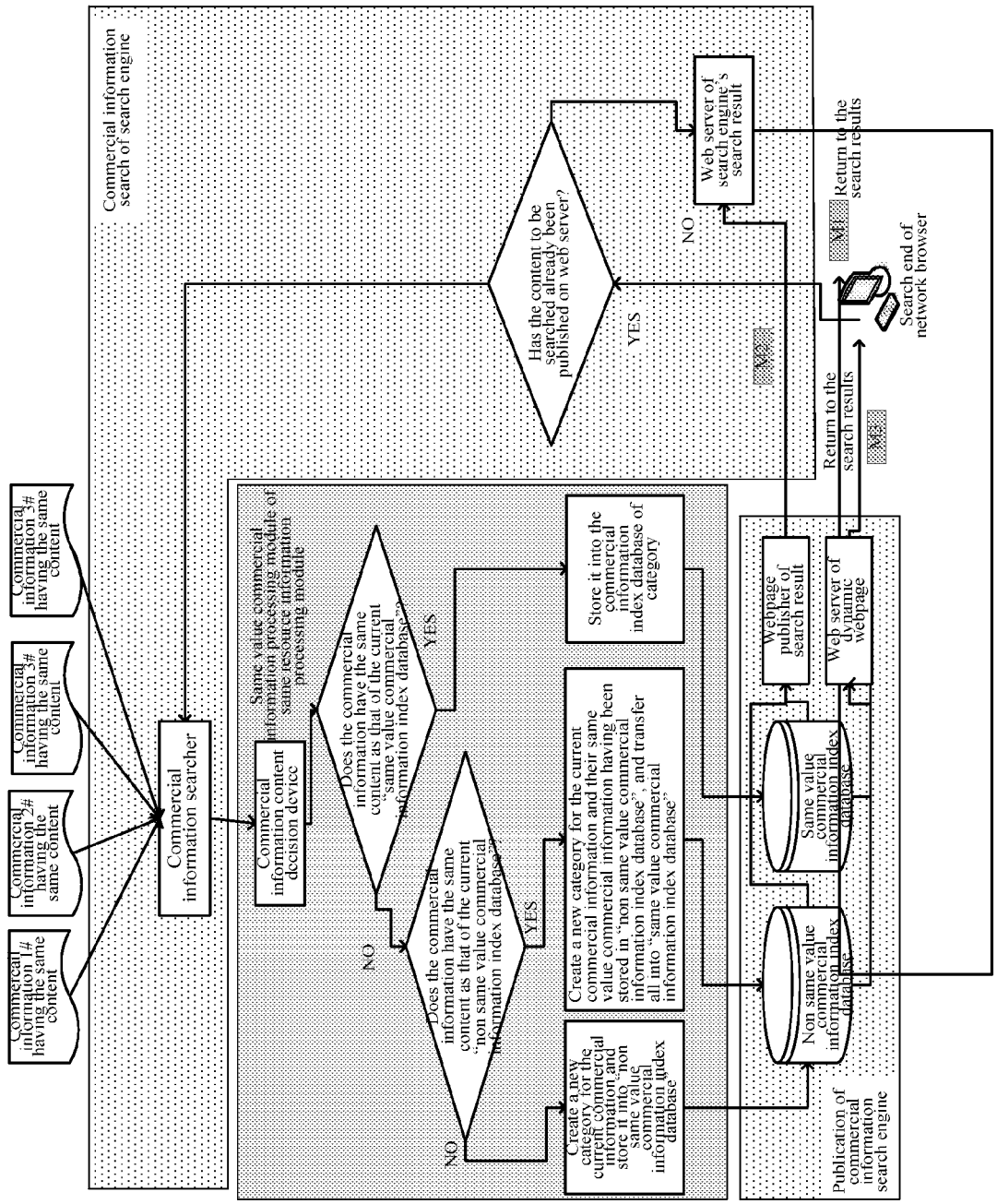
FIG. 10 is the flow chart of the same-value network service processing module.

FIG. 10 is the flow chart of the "same-value network service processing module". As for the network services according to search conditions, all "same-value network service processing module" adopts the hyperlinks on html webpage to provide for the inquirer. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-value network service index database" and "same-value network service index database" by "same-value information processing module", and periodically published onto "search engine's search result web server" by "search result webpage publisher", to avoid the repeat calculation and reduce the wait time of the calculation.

The processing steps of "same-value network service processing module" are as follows:

Step 1: receiving some search keywords from inquirers, and judging network service files or services to be required by the network service according to the content and syntax of keywords (e.g., if ".JPG" is contained in the keywords, then it means that the content to be searched is .JPG file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the network service access ports in accordance with conditions having the same source have been aggregated into one a "title search result"; another webpage including all search results may be picked up on the "web server of search engine's search result" after clicking the "same-value files" button, thereby making the inquirer be able to see all of the search results in accordance with conditions, and then the whole searching process is finished; if no searching objects have been published on the "web server of search engine's search result", and then initiating the Step 3.

Step 3: returning no matching network service result to the inquirer.

Step 4: adding the search keywords to next task of updating "non-same-value network service index database" and "same-value network service index database", and periodically initiating the updating process of the two databases.

Step 5: updating processes of the "same-value network service index database" and "non same-value network service index database", comprising:
  A. searching new target files or service entrances on the webpage by "network service searcher" and entering into the entrances by the network service to obtain the files or services.

B. judging whether the content of newfound network service is the same as that of the current "same-value network service index database" by the "network service content decision device", if "YES", then putting it into the category of the "same-value network service index database" as a new element; if "NO", then judging whether it has the same content as that of the current "non-same-value network service index database" by the "network service content decision device";.

C. creating a new category for the current network service and the same-value network service having been stored in the "non-same-value network service index database", and transferring all into the "same-value network service index database", if "YES"; if "NO", then creating a new category for the current network service, and storing it into the "non-same-value network service index database".

Step 6: generating the static webpage of the search results dynamically by the "search result webpage publisher" according to the content of the "same-value network service index database" and "non-same-value network service index database", publishing them onto the "web server of search engine's search results", and then displaying them to the inquirer via a browser (refer to the mark of "M2" of Figures).

For another implementation method of "Step 6" displaying the results to the inquirer directly through a browser by using "dynamic webpage web server" (refer to the mark of "M3" of Figures).

"Same-Value Commercial Information Processing Module"

Figure 11:
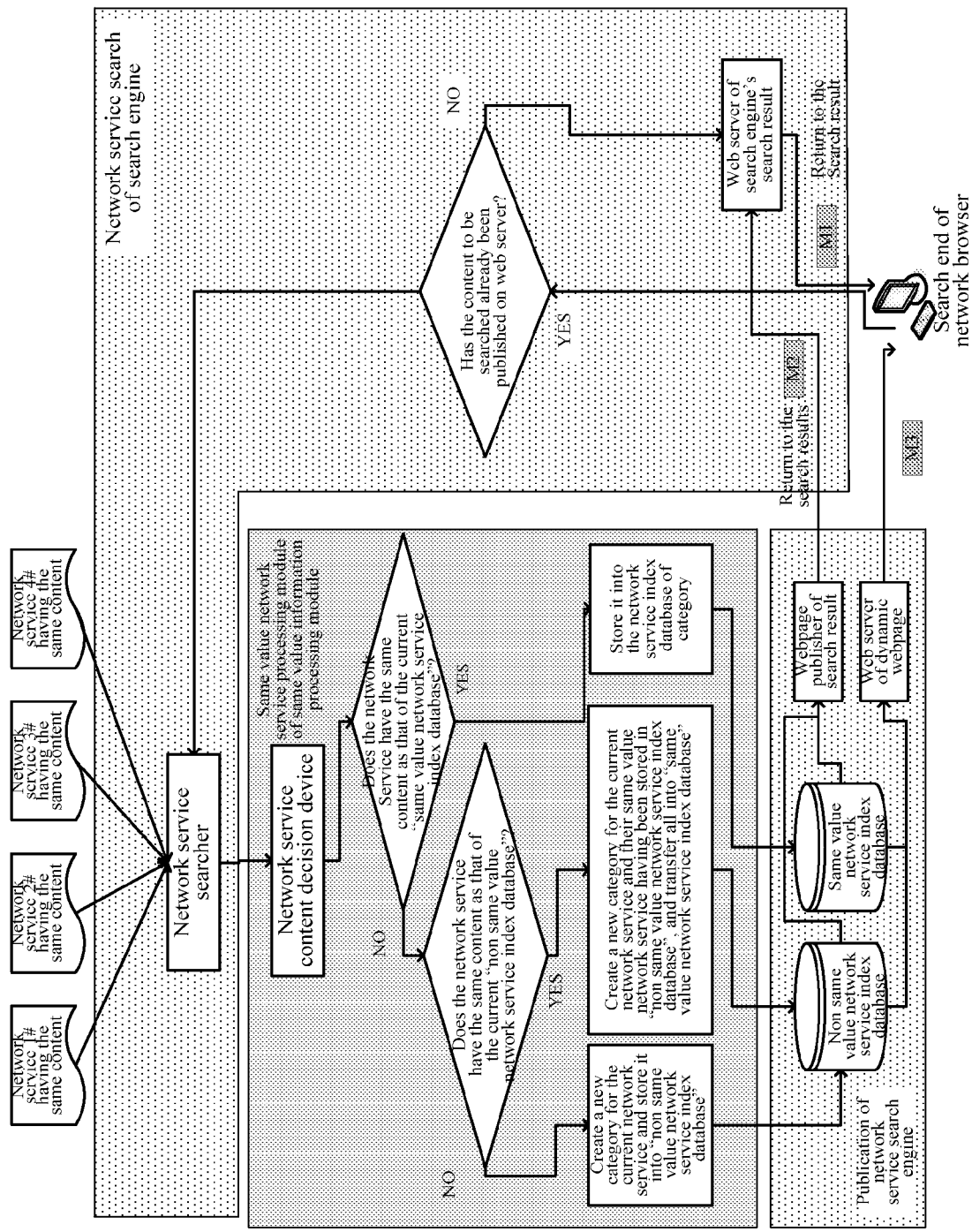
FIG. 11 is the flow chart of the same-value commercial information processing module.

FIG. 11 is the flow chart of the "same-value commercial information processing module". As for the commercial information according to search conditions, all "same-value commercial information processing module" adopts the hyperlinks on html webpage to provide for the inquirer. In order to optimize the system performance, we adopt the following techniques:

Using webpage publish technique, the search results are published in advance onto "search engine's search result web server" by using the "search result webpage publisher", and the searched search requests are responded directly, in order to avoid a great deal of calculation during the generation process from the database to the dynamic pages according to the requirements.

The processing results are classified and placed into "non-same-value commercial information index database" and "same-value commercial information index database" by "same-value information processing module", and periodically published onto "search engine's search result web server" by "search result webpage publisher", to avoid the repeat calculation and reduce the wait time of the calculation.

The processing steps of "same-value commercial information processing module" are as follows:

Step 1: receiving some search keywords from inquirers, and judging commercial information files or services to be required by the commercial information according to the content and syntax of keywords (e.g., if ".JPG" is contained in the keywords, then it means that the content to be searched is .JPG file, but not a webpage containing the text).

Step 2: judging whether the contents to be searched have already been published on the web server or not, if the search results have been published on the "web server of search engine's search result", then returning directly to the search results (refer to the mark of "M1" of Figures), in which the commercial information access ports in accordance with conditions having the same source have been aggregated into one a "title search result"; another webpage including all search results may be picked up on the "web server of search engine's search result" after clicking the "same-value files" button, thereby making the inquirer be able to see all of the search results in accordance with conditions, and then the whole searching process is finished; if no searching objects have been published on the "web server of search engine's search result", and then initiating the Step 3.

Step 3: returning no matching commercial information result to the inquirer.

Step 4: adding the search keywords to next task of updating "non-same-value commercial information index database" and "same-value commercial information index database", and periodically initiating the updating process of the two databases.

Step 5: updating processes of the "same-value commercial information index database" and "non same-value commercial information index database", comprising:

A. searching new target files or service entrances on the webpage by "commercial information searcher" and entering into the entrances by the commercial information to obtain the files or services.

B. judging whether the content of newfound commercial information is the same as that of the current "same-value commercial information index database" by the "commercial information content decision device", if "YES", then putting it into the category of the "same-value commercial information index database" as a new element; if "NO", then judging whether it has the same content as that of the current "non-same-value commercial information index database" by the "commercial information content decision device";.

C. creating a new category for the current commercial information and the same-value commercial information having been stored in the "non-same-value commercial information index database", and transferring all into the "same-value commercial information index database", if "YES"; if "NO", then creating a new category for the current commercial information, and storing it into the "non-same-value commercial information index database".

Step 6: generating the static webpage of the search results dynamically by the "search result webpage publisher" according to the content of the "same-value commercial information index database" and "non-same-value commercial information index database", publishing them onto the "web server of search engine's search results", and then displaying them to the inquirer via a browser (refer to the mark of "M2" of Figures).

For another implementation method of "Step 6", displaying the results to the inquirer directly through a browser by using "dynamic webpage web server" (refer to the mark of "M3" of Figures).

The feature of the "same-value commercial information processing module" is characterized in that it can automatically judge whether the multiple commercial information goals have the same use value for inquirers according to the features and supply of goods or services and the distribution of inquirers, thereby to be the basis of aggregation of these commercial information into one "title search result" and rank of the search results.

"Content decision device" can be generally applied in all kinds of "same-source (same-value) information processing module"

Preferred Embodiments of "Content Decision Device"

Examples of "Multimedia Content Decision Device":

1. Inputting: receiving multimedia files from multiple sources (If it is the player service, then record it into a file, or obtain information of multimedia files from the player server).

2. Processing: comparing the anastomosis degree of the multimedia content.

3. Returning: calculating the degree value of the same content in the inputted multimedia: SameMediaPower.

The specific method is as follows:

Step 1: Receiving "judged objects" which may receive multimedia files from multiple sources, and record quantities of "judged objects" as InputQuantity.

Step 2: Finding out comparable properties of "judged objects" in the following table, and recording quantities of "judged objects" having the same value with the current property as SameQuantity (e.g.: If there are five "judged objects", and three of them have the same properties, then the SameQuantity of the property=3)

Step 3: Inputting "power" values of the current property during the process of judgment (from the following table) as Power Step 4: Calculating the anastomosis degree of all of "judged objects" on the current property: PSame=SameQuantity*Power Step 5: Returning to Step 1, and executing Steps 1~4 for next property to obtain its "PSame", until the "PSame" of all properties are obtained.

Step 6: Calculating and returning the degree value of the same content of "judged objects": SameMediaPower=the sum of all the PSame/InputQuantity.

The judgment contents of the video files or the playing services are as follows:

| Properties of Video files | Power | WMV | AVI | MPG | Other formats | Notes |
|---|---|---|---|---|---|---|
| File name | 5 | Yes | Yes | Yes | | Only suitable for |
| File length | 5 | Yes | Yes | Yes | | video files |
| File checksum | 5 | Yes | Yes | Yes | | |
| File type | 5 | Yes | Yes | Yes | | |
| URL of playing server | 200 | Yes | Yes | Yes | | Only suitable for |
| IP address of playing server | 5 | Yes | Yes | Yes | | video playing |
| Port of playing server | 5 | Yes | Yes | Yes | | services |
| File header information | 5 | Yes | Yes | Yes | | It includes all the properties and values in the file header |
| Title | 2 | N/A | N/A | Yes | | |
| Subject | 2 | N/A | N/A | Yes | | |
| Author | 2 | N/A | N/A | Yes | | |
| Source | 2 | N/A | N/A | Yes | | |
| Vertical pixels of video | 10 | Yes | Yes | Yes | | |
| Horizontal pixels of video | 10 | Yes | Yes | Yes | | |
| Under protection | 2 | Yes | N/A | Yes | | |
| Duration of playing | 10 | Yes | Yes | Yes | | |
| Audio stream data rate | 5 | Yes | N/A | Yes | | |
| Audio sample width | 5 | Yes | N/A | Yes | | |
| Audio channel | 5 | Yes | N/A | Yes | | |
| Audio sample rate | 5 | Yes | N/A | Yes | | |
| Video stream data rate | 5 | Yes | Yes | Yes | | |
| Video sample width | 5 | Yes | N/A | Yes | | |
| Video stream name | 5 | Yes | N/A | Yes | | |
| Video frame rate | 5 | Yes | Yes | Yes | | |
| Standard of video code | 5 | Yes | Yes | Yes | | |

Notes:
1. The present invention relates to the method of calculating the importance of the comparison of every property by using "power" value, not only the specific value listed in the above table. The "power" in the table is just a typical value, variations of the value according to actual needs also fall into the scope of the present invention.
2. According to actual needs, some property value may be "null". When the property is "null" during calculating processes, it should not be regarded as the same properties.

The judgment content of audio files is as follows:

| Properties of audio files | Power | Wav | MP3 | WMA | Other formats | Notes |
|---|---|---|---|---|---|---|
| File name | 5 | Yes | Yes | Yes | | Only suitable for |
| File length | 5 | Yes | Yes | Yes | | audio files |
| File checksum | 5 | Yes | Yes | Yes | | |
| URL of playing server | 200 | Yes | Yes | Yes | | Only suitable for |
| IP address of playing server | 5 | Yes | Yes | Yes | | audio playing |
| Port of playing server | 5 | Yes | Yes | Yes | | services |
| File header information | 5 | Yes | Yes | Yes | | It includes all the properties and values in the file header |
| Artist | 5 | | Yes | Yes | | |
| Title of disc | 10 | | Yes | Yes | | |
| Published year | 10 | | Yes | Yes | | |
| Repertoire number | 10 | | Yes | Yes | | |
| Genre | 10 | | Yes | Yes | | |
| Lyric | 200 | | Yes | Yes | | |
| Title | 10 | | Yes | Yes | | |
| Note | 1 | | Yes | Yes | | |
| Source under protection | 1 | | Yes | Yes | | |
| Duration of playing | 10 | | Yes | Yes | | |

-continued

| Properties of audio files | Power | Wav | MP3 | WMA | Other formats | Notes |
|---|---|---|---|---|---|---|
| data rate of playing | 10 | | Yes | Yes | | |
| Channels | 10 | | Yes | Yes | | |
| Audio sample rate | 10 | | Yes | Yes | | |
| Audio file format | 10 | Yes | Yes | Yes | | |

Notes:
1. The present invention relates to the method of calculating the importance of the comparison of every property by using "power" value, not only the specific value listed in the above table. The "power" in the table is just a typical value, variations of the value according to actual needs also fall into the scope of the present invention.
2. According to actual needs, some property value may be "null". When the property is "null" during calculating processes, it should not be regarded as the same properties.

The judgment content of the Flash files is as follows:

| Properties of Flash files | Power | Flash | Other formats | Notes |
|---|---|---|---|---|
| File name | 5 | Yes | | Only suitable for Flash files |
| File length | 5 | Yes | | |
| File checksum | 5 | Yes | | |
| URL of playing server | 200 | Yes | | Only suitable for Flash playing service |
| IP address of playing server | 20 | Yes | | |
| Port of playing server | 20 | Yes | | |
| File header information | 20 | Yes | | It includes all the properties and values in the file header |

Notes:
1. The present invention relates to the method of calculating the importance of the comparison of every property by using "power" value, not only the specific value listed in the above table. The "power" in the table is just a typical value, variations of the value according to actual needs also fall into the scope of the present invention.
2. According to actual needs, some property value may be "null". When the property is "null" during calculating processes, it should not be regarded as the same properties.

Examples of "Picture Content Decision Device":

1. Inputting: receiving pictures from multiple sources.
2. Processing: comparing the anastomosis degree of the picture content.
3. Returning: calculating the degree value of the same content in the inputted picture: SamePicPower.

The specific method is as follows:

Step 1: Receiving "judged objects" which may receive picture from multiple sources, and record quantities of "judged objects" as InputQuantity.

Step 2: Finding out comparable properties of "judged objects" in the following table, and recording quantities of "judged objects" having the same value with the current property as SameQuantity (e.g.: If there are five "judged objects", and three of them have the same properties, then the SameQuantity of the property=3)

Step 3: Inputting "power" values of the current property during the process of judgment (from the following table) as Power Step 4: Calculating the anastomosis degree of all of "judged objects" on the current property: PSame=SameQuantity*Power Step 5: Returning to Step 1, and executing Steps 1~4 for next property to obtain its "PSame", until the "PSame" of all properties are obtained.

Step 6: Calculating and returning the degree value of the same content of "judged objects": SamePicPower=the sum of all the PSame/InputQuantity.

Judging the similarity degree according to various properties of pictures and picture recognition software:

| Properties of picture files | Power | JPG | BMP | GIF | Other formats | Notes |
|---|---|---|---|---|---|---|
| File name | 5 | Yes | Yes | Yes | | It only takes effect on the same type of files |
| File length | 5 | Yes | Yes | Yes | | |
| File type | 5 | Yes | Yes | Yes | | |
| File checksum | 5 | Yes | Yes | Yes | | |
| File header information | 5 | Yes | Yes | Yes | | |
| Vertical pixels of picture | 5 | Yes | Yes | Yes | | |
| Horizontal pixels of picture | 5 | Yes | Yes | Yes | | |
| Vertical resolution | 5 | Yes | Yes | Yes | | |
| Horizontal resolution | 5 | Yes | Yes | Yes | | |
| Position depth | 5 | Yes | Yes | Yes | | |
| Frame | 5 | Yes | Yes | Yes | | |
| Title | 2 | Yes | Yes | Yes | | |
| Subject | 2 | Yes | Yes | Yes | | |
| Keyword | 2 | Yes | Yes | Yes | | |
| Note | 2 | Yes | Yes | Yes | | |
| Author | 2 | Yes | Yes | Yes | | |
| Recognition of picture similarity degree | 20 | Yes | Yes | Yes | | It may take effect on different types of files |

Notes:
1. The present invention relates to the method of calculating the importance of the comparison of every property by using "power" value, not only the specific value listed in the above table. The "power" in the table is just a typical value, variations of the value according to actual needs also fall into the scope of the present invention.
2. According to actual needs, some property value may be "null". When the property is "null" during calculating processes, it should not be regarded as the same properties.

Examples of "Text Content Decision Device"

"Text content decision device" can be realized by software:

1. Inputting: receiving texts from multiple sources as "judged objects".
2. Processing: comparing the anastomosis degree of the content.
3. Returning: having the anastomosis degree value of SameTextPower between the "judged objects".

The concrete method is as follows:

Step 1: Finding out the total length of the same words or sentences in the inputted texts as "SameLenth".

Step 2: Finding out the length of the shortest text in the inputted texts as "MinLenth"

Step 3: Returning to the similarity degree value of the text: SameTextPower=SameLenth/MinLenth According to the method, it may be found in the text that the longest text is usually an article divided into fewer pages or having a large number of advertisements and external hyperlinks; and the shortest text is usually an article divided into more pages or having a large number of the least advertisements and external hyperlinks.

Examples of "Hyperlink Content Decision Device"

"Hyperlink content decision device" can be realized by software, and it is used to compare whether the hyperlinks from the multiple webpage have the common characteristics or not.

1. Inputting: URL addresses of multiple groups of hyperlinks (each group of hyperlinks is generally the whole hyperlinks obtained from one webpage).
2. Processing: calculating the anastomosis degree of URL addresses for each group of hyperlinks.
3. Returning: having the quantity of the same hyperlinks every group.

The concrete method is as follows:

Step 1: Receiving the "judged objects" which may be multiple URL addresses of hyperlinks;

Step 2: Calculating the similarity degree of the "judged objects": SameURLPower=the quantity of the URL addresses which have appeared in each group of hyperlinks.

Step 3: Returning to SameURLPower.

Examples of "Software Content Decision Device"

"Software content decision device" is used for comparing whether the inputted multiple software are the same type of software or not.

1. Inputting: receiving software from multiple sources.
2. Processing: comparing the anastomosis degree of the software contents.
3. Returning: having the anastomosis degree value of the software contents.

The concrete method is as follows:

Step 1: receiving the "judged objects" which may be multiple inputted files or catalogs, and recording the quantity of the "judged objects" as InputQuantity.

Step 2: finding comparable properties of the "judged objects" in the following table, recording the quantity of the "judged objects" having the same value with the current property as SameQuantity (e.g.: If there are five "judged objects" and three of them have same property, then the SameQuantity of the property=3)

Step 3: inputting the "power" value of the current property during the judging process (from the following table) as Power Step 4: calculating the anastomosis degree of all the "judged objects" on the current property: PSame=SameQuantity*Power Step 5: returning to Step 1, and executing Steps 1~4 for next property to obtain its "PSame", until the "PSame" of all the properties are obtained.

Step 6: calculating and returning the anastomosis degree value of the "judged objects": SameSoftPower=the sum of all the PSame/InputQuantity.

| Property of software | Power | Installed files | Compressed files | Installed directory | Other formats | Notes |
|---|---|---|---|---|---|---|
| Length of Software package | 5 | N/A | Yes | Yes | | |
| Quantity of software package files | 5 | N/A | Yes | Yes | | |
| Name of each software package file | 5 | N/A | Yes | Yes | | |
| File name | 5 | Yes | Yes | Yes | | Suitable for the |
| File length | 5 | Yes | Yes | Yes | | same type of |
| File checksum | 5 | Yes | Yes | Yes | | files |
| File header properties | 5 | Yes | Yes | Yes | | |
| Information of edition: file edition | 1 | Yes | Yes | Yes | | Suitable for the single file |
| Information of edition: Descriptions | 1 | Yes | Yes | Yes | | Suitable for every file in the |
| Information of edition: Copyright | 1 | Yes | Yes | Yes | | package. |
| Information of edition: Product version | 2 | Yes | Yes | Yes | | |
| Information of edition: Product name | 2 | Yes | Yes | Yes | | |
| Information of edition: Company | 2 | Yes | Yes | Yes | | |
| Information of edition: Trademark | 2 | Yes | Yes | Yes | | |
| Information of edition: Internal name | 1 | Yes | Yes | Yes | | |
| Information of edition: File version | 1 | Yes | Yes | Yes | | |

-continued

| Property of software | Power | Installed files | Compressed files | Installed directory | Other formats | Notes |
|---|---|---|---|---|---|---|
| Information of edition: language | 1 | Yes | Yes | Yes | | |
| Information of edition: Source code name | 1 | Yes | Yes | Yes | | |
| Information of edition: Suitable operating system | 1 | Yes | Yes | Yes | | |
| Information of edition: Author | 1 | Yes | Yes | Yes | | |
| Information of edition: Source | 1 | Yes | Yes | Yes | | |
| Information of edition: Revised edition | 1 | Yes | Yes | Yes | | |

Notes:
1. The present invention relates to the method of calculating the importance of the comparison of every property by using "power" value, not only the specific value listed in the above table. The "power" in the table is just a typical value, variations of the value according to actual needs also fall into the scope of the present invention.
2. According to actual needs, some property value may be "null". When the property is "null" during calculating processes, it should not be regarded as the same properties.

Example of "Data or Database Content Decision Device":

Comparing each of data record content in different databases one by one to find out whether it is equal or not, and whether the returned consistent degree value of these databases SameDBPower exceeds the threshold or not.

SameDBPower=Record quantity with the same field name and the same value/the minimum record quantity in the compared database.

SameDBPower reflects the proportion of the same content record quantity to the minimum record quantity of the database, and the range of SameDBPower is 0~1.

Example of "Data or Database Content Decision Device"

As for data files, the following steps can be applied:

Step 1: choosing a file as "a comparing standard" randomly from the multiple compared data files;

Step 2: making a rough comparison of consistency between "comparing standard" and other files: information of file property such as file length, file checksum, title, subject, version, author, type, keywords, note, etc.

Step 3: judging them to be "roughly consistent" if they are consistent, and this result can be directly used for output of "data or database content decision device";

Step 4: entering into the step 5 for the files obtaining "roughly consistent" if further comparison is needed;

Step 5: Elaborate comparison: comparing information of the file properties byte by byte, the files whose all characters are same, can be judged to be "absolutely consistent" as the output of the "data or database content decision device".

As for database files, the following steps can be applied:

Step 1: Judging whether the input database files have the same database format or not according to the filename suffix and file properties.

Step 2: Entering into the Step 3 for the same database format, and entering directly into the Step 4 for non-same database format.

Step 3: Rough comparison of database in the same format: information of file properties such as file length, file checksum, title, subject, version, author, type, keywords, note, etc., if the above features are not completely consistent, it may judge them to be "inconsistent" as the results output; as for the files completely consistent, then enter into the step 4.

Step 4: Elaborate comparison of databases: (this step is suitable for the content comparison between various databases) extracting the "database table" one by one according to the format of each database file, and judging whether the structure of "database table" are same or not, and judging them to be "inconsistent" as the results output when they are not consistent; As for the consistent database file, entering into the Step 5.

Step 5: Comparing the content of each record in the database files one by one: when the contents of the records are the same, adding 1 to the counter whose "SameRecNum" have the same field name and the same quantity".

Step 6: Calculating "SameDBPower (the same degree of databases)"=SameRecNum record quantity with the same field name and the same quantity/the minimum record quantity in the compared database. (SameDBPower reflects the proportion of the same content record quantity to the minimum record quantity of the database, and the range of SameDBPower is 0~1).

Step 7: Judging whether "SameDBPower: the consistent degree of databases" exceeds the threshold or not, if "YES", then output "consistent" as the judging result, otherwise, output "inconsistent" as the judging result.

Example of "GIS Information Content Decision Device"

"GIS information content Decision device" can be realized by software:

1. Inputting: Receiving digital maps from multiple sources as "judged objects";

2. Processing: Comparing the anastomosis degree of the coverage scope of the digital maps;

3. Returning: The consistent degree value between the "judged objects": SameMapPower (the range is 0~1).

Specific processing steps are as follows:

Step 1: Opening the compared digital map files according to their formats.

Step 2: Finding out the latitude and longitude of northwest corner and the southeast corner (may be diagonals of map in other forms as well) of the digital map;

Step 3: Comparing the error of latitude and longitude of northwest corner and the southeast corner of the compared digital map, and then calculating the consistency value of the coverage area of the map as SameMapPower:

Suppose that "Map1" and "Map2" participate in the comparison,

Then,

SameMapPower=the area of the overlapped region of the two maps/the area of the smaller one in the two maps;

Step 4: returning to the value of SameMapPower;

Step 5: Judging whether the SameMapPower exceeds the threshold or not (e.g.: threshold=0.8), if "YES", then judging that they are the same maps; otherwise, judging that they are different maps.

Example of "Network Service Content Decision Device"

FTP Service Content Judgment of "Network Service Content Decision Device"

Step 1: Logging in the compared services by adopting the corresponding FTP protocol, and getting its internal files;

Step 2: After getting the files of FTP service, firstly judging whether the file types are the same or not according to the filename suffix, if they are not the same, then return to "inconsistent" as the output, if they are the same, enter into the Step 3;

Step 3: Judging whether the content of the files are the same or not according to the file type by adopting "multimedia content decision device", "picture content decision device", "text content decision device", "software content decision device", "data or database content decision device" or "GIS information content decision device" and return to the judging results.

Email Service Content Judgment Supplied by the Email Website:

Email service information supplied by the email website mainly includes searching the webpage of every website via software and parsing the information such as mailbox size, charging situation, whether supporting POP protocol or not, etc. from web labels.

Step 1: Dividing the mailbox sizes into the corresponding grades (e.g.: 10 MB~25 MB, 25 MB~100 MB, 100 MB~300 MB, 300 MB~1 GB, 1 GB~100 GB, etc.), then judging whether the compared mailboxes are in the same grade or not, if "NO", then return to "inconsistent", if "YES", then enter into the Step 2;

Step 2: Comparing whether the charging situation is the same or not, if "NO", then return to "inconsistent", if "YES", then enter into the Step 3.

Step 3: Comparing whether the condition for supporting POP protocol is the same or not, if "NO", then return to "inconsistent"; if "YES", then return to "consistent".

Example of "Commercial Information Content Decision Device"

It may used for judging whether the information of products or service sale published on the webpage are the same or not, and whether are in the same physical geography area, same political geography area, same distance area.

Step 1: Comparing whether the commercial compared information is the same product or service or not, if "NO", then return to "inconsistent", if "YES", then enter into the Step 2.

Step 2: Judging whether the compared commercial information has the sensitivity to geography location or not (for example, consuming goods in the life, services that need people go to the scene have the sensitivity to geography location, such as ice-cream, tutoring services, etc.), if "NO", then return to the judging result of "consistent", if "YES", then enter into the Step 3.

Step 3: Judging whether the providers of the compared commercial information are in the same city or region, if "NO", then return to the judging result of "inconsistent", if "YES", then return to the judging result of "consistent".

Example of "Subsystem for Obtaining the Attention Degree of Webpage Users"

Figure 12:
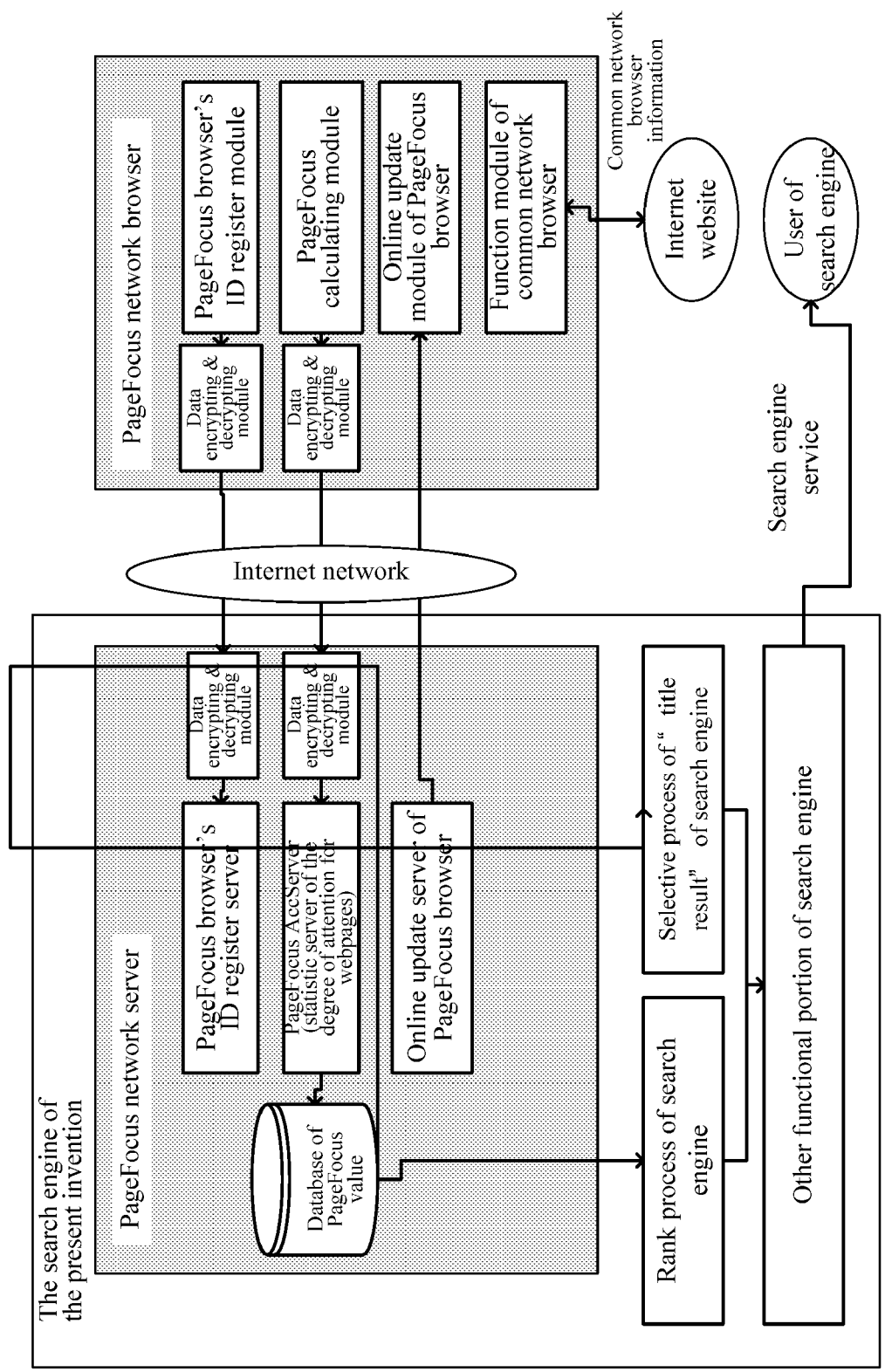
FIG. 12 is the block diagram of the system structure of obtaining the users' attention degree of the webpage.

FIG. 12 is the structural chart of the subsystem for obtaining the attention degree of webpage users. This search engine can work in coordination with ancillary network browser (or a third party network browser which can be compatible with the communications protocol between the search engine and the ancillary webpage browser), the network browser collects the attention degree of each webpage and send it to the search engine as the reference of search results rank or choosing of "title search result" by the search engine. This method and device can form the web query system which is able to provide with the "rank of webpage popular degree" independently without the search engine, and can be used for proceeding with the commercial services or getting other benefits as the exchange condition.

This subsystem mainly includes two parts: "PageFocus network server" and "PageFocus network browser".

Structure of "PageFocus Network Server"

"PageFocus network server" obtains the attention degree of the global users to each webpage via "PageFocus network browser", and forms the "Database of PageFocus" for the webpage, as the reference to the measure value of webpage popular degree.

"PageFocus network server" consists of the following parts:

(1) "ID register server of PageFocus browser": assigning a worldwide unique ID mark for the "PageFocus Web browser" being used on the network;

(2) "PageFocusAccServer": receiving "PageFocus" of one or multiple webpages contained in the "PageFocus data packet" sent by global "PageFocus network browser" in using, wherein the ID is used for distinguishing the different users;

(3) "Online update server of PageFocus network browser": providing online update services to the global "PageFocus network browser";

(4) "Data encrypting & decrypting module": transmitting the encrypted data between "PageFocus network severer" and "PageFocus network browser" and protecting information from being attacked or stolen.

Structure of "PageFocus Network Browser"

"PageFocus network browser" reports the attention degree to certain webpage of the current users to "PageFocus network severer" via network.

"PageFocus web browser" consists of the following parts:

(1) "PageFocus calculating module": calculating the attention degree of the user to certain webpage according to his operation on the "PageFocus network browser", and forming the "PageFocus data packet" to report to the "PageFocusAccServer";

(2) "PageFocus browser's ID register module": communicating with "PageFocus browser ID's register server" to get the worldwide unique ID mark as the reference for distinguishing the different users;

(3) "Online update module of PageFocus network browser": communicating with "online update server of PageFocus network browser" in order to assure the "PageFocus Browser" is the last version;

This device consists of "PageFocus network browser", "PageFocus browser's ID register server" and "PageFocusAccServer" created by the present invention. The specific processing steps are as follows:

Step 1: Developing a special "PageFocus network browser", wherein every browser has a worldwide unique ID mark when being installed, or initiatively searches "PageFocus browser's ID register server" on the network to get a worldwide unique ID mark in using;.

Step 2: Making the "PageFocus Web browser" have all functions of a conventional network browser (e.g.: The IE browser of Microsoft).

Step 3: Converting the user' operation for browser and webpage to the "PageFocus" of webpage according to the power in the following table and forming "PageFocus data packet" by "PageFocus network browser", then transmitting it to the "PageFocusAccServer" of the search engine via network protocol in an encryption manner.

Step 4: Accumulating the "PageFocus" score contained in it to the corresponding webpage by "PageFocusAccServer" after receiving the "PageFocus data packet" sent by every global "PageFocus network browser".

Step 5: Handling the information of "PageFocus" of every global webpage contained in "PageFocusAccServer" in various methods to form the reference of webpage rank by search engine, references of choosing "title search result" from the search results with the same content, or publishing it directly out as the service of "rank of webpage popular degree".

The Calculation Method of "PageFocus" by "PageFocus Web Browser":

Because the "PageFocus network browser" has all the functions of a conventional network browser, when the user uses the browser, it may gather his operating actions according to the following table and calculate the "PageFocus" score according to the "power" of every action, and generate a "PageFocus" record about the webpage when the browser closes the webpage thoroughly to send to "PageFocusAccServer" in the form of "PageFocus data packet".

| Operations of the browser | Power | Comments |
| --- | --- | --- |
| Opening a webpage | 1 | The user is interested in opening the webpage |
| Staying for less than 10 sec. in a webpage | −10 | A disgusting webpage |
| Staying for less than 30 sec. in a webpage | −3 | Without interest or very simple content. |
| Staying for less than 1 min in a webpage | −1 | Without interest or very simple content. |
| Staying for more than 1 min in a webpage | 3 | A common webpage browse |
| Staying for more than 5 min in a webpage | 5 | A more serious webpage browse |
| Speed of reading words | 100/speed of reading words | 1. "Speed of reading words" can be calculated by judging user's operating scope and frequency for keyboard, mouse wheel and "drag of scroll bar" as well as the font size of the webpage contents; 2. "Speed of reading words" = quantity of scrolled text/time interval of scrolling; 3. Unit of "speed of reading words" is words/sec.; 4. Note: reading at 100 words/1 sec. means careless, then gain 1 point; reading at1 word/1 sec. means very careful, then gain 100 points. |
| The picture of the webpage is clicked, but the hyperlink of the picture points to another picture. | 3 | It means the picture may provide a "larger picture", and it may be the main content of the webpage, and the user's clicking means he/she wants to look at the larger one carefully. |
| The picture of the webpage is clicked, but the hyperlink of the picture points to another webpage of the same website. | 1 | It may be an advertisement picture. |
| The picture of the webpage is clicked, but the hyperlink of the picture points to anther webpage of another website. | 0 | It may be an advertisement picture. |
| The hyperlink of the webpage is clicked, but the target is in the same directory with the current page. | 2 | It may be a serial webpage of the same article, both of the current webpage and the target webpage pointed by the clicked hyperlink can obtain scores of the "power", e.g.: "http:/www.yoogol.com/news/01.htm" and "http:/www.yoogol.com/news/02.htm" |
| The hyperlink of webpage is clicked, but the target is a webpage of another website. | 0 | There is nothing to do with the current webpage. |
| The webpage content contains the words with the titles having the meaning of sequence numbers, such as "1 2 3 4", and the target points to the hyperlink of webpage with the same URL directory. | N | The current webpage and the webpage with the title having the meaning of sequence numbers, such as: "1 2 3 4", and the webpage of its target pointing at the same URL directory are usually the pagination display of the same article; scores of any page of the article (including negative score) is the same as that of other pages, even if they have not been opened. |
| Using browsers by users and clicking a menu of the right key of mouse and voting: "voting −10 points" | PageFocus * 0% | 1. Using a menu of the right key of mouse for any parts of webpage in the browser, there are some menu options such as "Voting 10 points", "Voting 5 points", "Voting 1 point", "Voting −1 point", "Voting −5 points", and "Voting −10 points". 2. When the menu of the right key is used by users to vote the background of the current webpage, the score of PageFocus = the score of PageFocus of the current webpage * power 3. When the menu of the right key is used by users to vote various elements of the current webpage, the score of PageFocus of the webpage pointed by the hyperlink of the element = the score of PageFocus of the current webpage * power. |
| Using browsers by users and clicking a menu of the right key of mouse and voting: "Voting −5 points" | PageFocus * 10% | |
| Using browsers by users and clicking a menu of the right key of mouse and voting: "Voting −1 point" | PageFocus * 50% | |
| Using browsers by users and clicking a menu of the right key of mouse and voting: "Voting 10 points" | PageFocus * 10 | |
| Using browsers by users and clicking a menu of the right key of mouse and voting: "Voting 5 points" | PageFocus * 5 | |

| Operations of the browser | Power | Comments |
|---|---|---|
| Using browsers by users and clicking a menu of the right key of mouse and voting: "Voting 1 point" | PageFocus * 1 | |

Notes:
1. There may be possibilities of misjudgments by using this standard of scoring, but the statistic accuracy may be obtained via a large number of operations on the network.
2. The concrete scores in the table are just the typical values; the present invention relates to scoring for the webpage via browser, any other values of "power" and "power items" are all belongs to the scope of the present invention.
3. Adopting the method of users' voting for the webpage is based on the trust in the netizen's social morality, so we get the values of "power" by multiplying the overall scores, but not addition of math.
4. Every webpage may accumulate a large number of PageFocus scores, which may lead to the overflow of software variations; so we use "logarithm" or "scientific counting method" to record the score on the "PageFocusAccServer".
5. As for another ways of the present method, other rules can be used for deciding opportunities when the "PageFocus data packet" is formed besides forming the "PageFocus data packet" when the browser closes the webpage thoroughly, e.g., periodically, when a certain score is accumulated, etc. All of these methods belong to the scope of the present invention.
6. The detailed calculation methods of "speed of reading words" in the table are as follows:
A. scrolling of mouse wheel: the speed of reading words = (the width of the display area/the width of the font) * the quantity of lines of scrolled words per time/time interval of scrolling;
B. flipping of keyboard: the speed of reading words = (the width of the display area/the width of the font) * the quantity of lines of words of flipping per time/time interval of flipping;
C. scrolling of window scroll bar: the speed of reading words = (the width of the display area/the width of the font) * the quantity of lines of scrolled words per time/time interval of scrolling.

Formation Method of "PageFocus Data Packet"
Content of "PageFocus Data Packet":

| Sequence | Segment names | Notes |
|---|---|---|
| Record 1 | PageFocus browser's ID | The ID for PageFocus browse sending "PageFocus data packet" |
| | URL of webpage | URL address of the scored webpage |
| | PageFocus score of webpage | PageFocus score of the scored webpage |
| Record 2 | | |
| Record N | | |

Notes:
Every "PageFocus data packet" may contain scoring records of multiple webpage. Other properties can be added to the scoring record of every webpage, and only the most important information is listed in the table in order to improve the efficiency. Other properties added to this table also belong to the scope of the present invention.

The choosing of sending opportunity of "PageFocus data packet" is as follows:

To reduce the occupied bandwidth of "PageFocus data packet" sent and the pressure to the servers, the following schemes can be used:

Send "PageFocus data packet" when a certain webpage being closed thoroughly by browser;

Send "PageFocus data packet" when the browser being closed thoroughly;

Store "PageFocus data packet" in the form of files in local computer by the browser, and send them out after being accumulated to a certain quantity, certain length, or certain cycle time.

Algorithm for Choosing "Title Search Result"

This algorithm is mainly used for choosing "same-source search result" that can be used as "title search result" from the original search result. The algorithm is used for solving the following problems:

1. Judging the quality of the webpage via the action of the network users and the content of the webpage, and preferably show the higher quality webpage;

2. Avoiding suffering from too much click flow and leading to slow down of treating speeds of website server or even collapse of it, because of becoming "title search result" from a search result;

3. Avoiding suffering from too much click flow and leading to slow down of responding speeds of server or reducing the favor of visitors, because of becoming "title search result" from a search result;

4. Making "title search result" as a kind of power, so as to provide for the websites needs, the owners of these websites may purchase this power;

5. The original result of every "same-source search result" has opportunities to become "title search result" according to a certain probability.

The choosing method of "title search result" is that when choosing a "title search result" in the "same-source search result", simultaneously considering such three factors as "content quality of search result", "weighted values" and "service response delay", that is, preferably displaying higher quality content; preferably displaying weighted values; and preferably displaying better network services. This principle will also be complied to when arranging all of "same-source search result", and the "weighted values" can be purchased from the operators of the system of the present invention.

The specific steps of "title search result" are as follows:

Step 1: calculating the probability of power value ($PW_n$) that every "same-source search result" becomes "title search result" as $PW_n$ (the search result is the n item), $$PW_n = TP * \text{PageFocus}/(\text{RespDelay} - K),$$

Note 1: when the (RespDelay−K) is less than or equals to zero, (RespDelay−K) should be 1.

Note 2: the meaning of variants in the formula are as follows:

A. PageFocus (the value of webpage attention degree): is referred to as the "PageFocus" value of the search result obtained by the "device and method for obtaining the attention degree of webpage users" of the present invention;

B. RespDelay (the service response delay of the webpage): is referred to as the response delay of the search result when providing the inquirers for visit services (the visit experience depends on response speeds, so the slower the response is, the worse the experience is);

C. K, the constant of service response delay: a definable constant, the recommended K is set 50 msec. The service response delay is less than K, it will not be found. It has no influence on visit experiences, and may be ignored accordingly;

D. TP, the power of "title search result": as a power, anyone can get TP (the power of "title search results") through various exchange conditions with the system operators of the present invention;

E. Another algorithms for this formula are as follows.

$$PW_n = (TP + \text{PageFocus})/(\text{RespDelay} - K), \quad \text{a.}$$

$$PW_n = (TP + \text{PageFocus})/\text{RespDelay}/K, \quad \text{b.}$$

$$PW_n = TP * \text{PageFocus}/\text{RespDelay}/K; \quad \text{c.}$$

PageFocus: the value of webpage attention degree,

RespDelay: the response delay of webpage service.

Step 2: summing up the probability power value (PWn) of the entire original "same-source search result", PWall is the power value of the entire probability.

Step 3: calculating the probability that every "same source search result" becomes "title search result": Pn=PWn/Pwall.

Step 4: choosing "title search result" dynamically and randomly with visiting actions of inquirers according to the probability of Pn value, and displaying it to the inquirers.

Website Content and Style Self-Adapting Device and Method

The present invention relate to provide different styles for users in different working or living leisure status when they visit the same URL address without any operations, registrations, setup or cookies by using various information available and helpful for judging the environment and state the users stay in:

1. Judging the country or region of users staying in, by using users' IP address, and then combine with the time of the website to calculate the local time of the users, and judging whether the user is working or leisure status through his local time;

2. Searching properties of the IP address through the user's IP address, such as home, workplace, etc, and providing proper contents and styles suitable for the environment he stays in through his location;

3. Obtaining geographic locations of the user via the user's IP address, and ranking the nearest provider in the forefront of the list automatically when he inquires the commercial information.

For example:

Different users will see different contents when they visit a webpage with the same URL on the website at the same time:

A. People in the working state or environment will see a superb and simple webpage without any entertainment and leisure information.

B. People in leisure state or environment will see a vivid webpage that may has entertainment and leisure information and advertisement of personal consumption.

Figure 13:
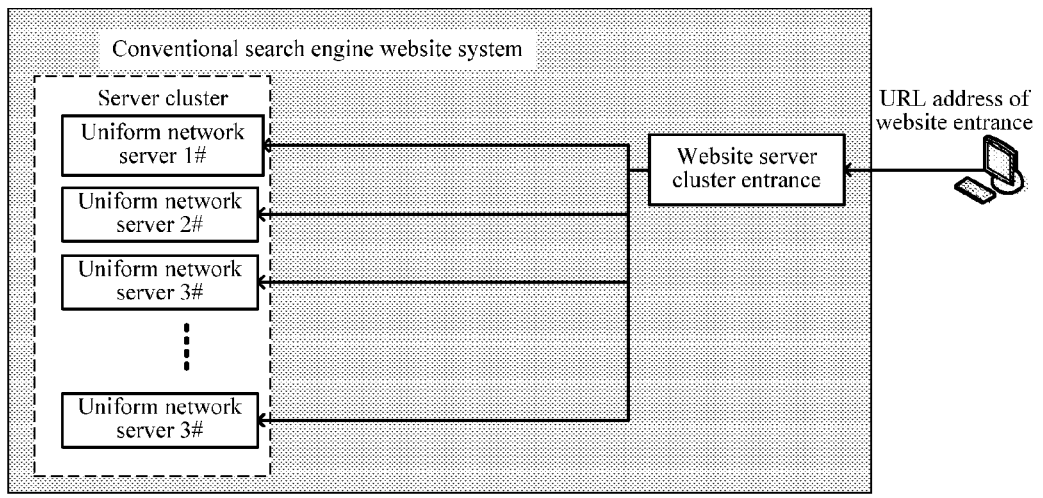
FIG. 13 is the conventional search engine website system without any styles and contents self-adapting technique.

The present invention may be partially or wholly used for the website systems besides the search engine, all of which belong to the scope of the present invention Currently, various large-scale websites adopt the server cluster or even the subsystem of local service to diffluent the users' visits, but the important characteristic of the current server cluster is that every cluster member provides the same content. As described in FIG. 13, the user's visit is assigned to a certain member server of the server cluster with the same content by the "website server cluster entrance" without considering the character.

Figure 14:
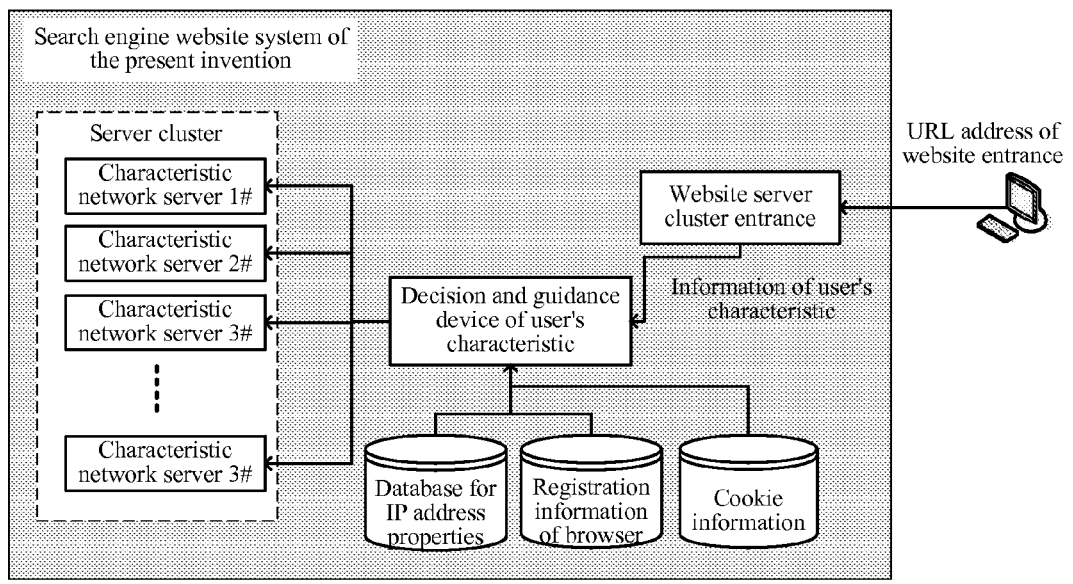
FIG. 14 is the search engine website system with styles and contents self-adapting technique of the present invention.

As shown in FIG. 14, the present invention makes some changes to the above structure. After receiving a user's visit by the "website server cluster entrance", it judges whether the user is in the working state or not according to various property information of the user such as the IP address sent when he visits a website, and then provide him information services with different contents and styles based on whether he stays in the working state.

A method of judging the status of the user automatically and providing the suitable style and contents of webpage, comprising the following steps:

(1) firstly dividing the server cluster into two groups containing "working style" and "personal and leisure style", no matter static or dynamic page, automatically generating two kinds of styles when updating the same contents for these two kind of servers, in order to make the users from different situations see different styles when visiting the same URL webpage;

(2) obtaining users' IP addresses in the visit protocol (or IP protocol) after receiving a request of the first visit to the webpage of the website by "system server cluster entrance";

(3) searching whether IP addresses are "workplace IP address" or "personal leisure IP address" according to "IP address property database", if it is "workplace IP address", then entering into Step (4); if it is "personal leisure IP address", then entering into Step (5);

(4) obtaining geography locations of "workplace IP address" and getting the local time of the geography area, if the time in the IP addresses' area belongs to the working time (8:00~20:00 from Monday to Friday), then assigning the visit to the "working style server" of the server cluster to provide him webpage services suitable for the working place; otherwise, entering into the Step (5);

(5) Assigning visits to "personal leisure style server" to provide him with the webpage services suitable for personal and leisure status.

I claim:

1. A composite display method for a search engine of same resource information used for a system for obtaining the degree of attention PageFocus of webpage user necessary, comprising the following steps:

(1) visiting a search engine via a web browser or application software, and inputting keywords to be searched by an inquirer;

(2) finding all target stations that correspond to some conditions as original search results by the search engine;

(3) searching for some account information of power purchasers of title search results via a "same-source information processing module" and combining it with judging rules to choose from the original search results as the object of title search results;

(4) only regarding the title search result selected as the search results to show the inquirer via the search engine web server or application server, and providing the inquirer for a button with meanings of opened details;

(5) pushing a corresponding button by the inquirer, and then displaying the original search results found in Step (2) by the search engine to the inquirer;

wherein the "same-source information processing module" includes the following steps:

(1) judging categories of information received by a network searcher via "information category judging module";

(2) concentrating information of the same category and sending it to the corresponding "same-source information processing module";

(3) returning to the searching information processed by the "information processing module" to the web server;

wherein the steps of processing the webpage information by the "same-source information processing module" are as follows:

(1) judging whether the keywords have recently been searched by other users or not by the decision device whose search results have been published on the web server when the search part of the search engine partially receives the keywords to be searched; if it has been searched and the results have been published on the web server of the search engine's search result, and then directly return to the search results, in which the webpage having the same source has already been aggregated into one search result; after clicking the button of "same-source webpage", another search result webpage including all search results are picked up on the web server of search engine's search result, and then the whole searching process is finished;

(2) if the decision device whose search results have been published on web server judges the keywords have not been searched recently by other users, when the search engine partially receives the keywords to be searched, and no corresponding search results has been published on the web server of the search engine's search result; then A. initiating the "webpage searcher" to search "non-same-source webpage result database" and "same-source webpage results database" to find out the address of webpage in accordance with the search keywords, and obtain contents of the webpage;

B. returning the result of "no matching webpage" to the inquirer, if no address of webpage in accordance with the search keywords is found in "non-same-source webpage result database" and "same-source webpage result database" of "webpage searcher", and adding the search keywords to next new task of updating "non-same-source webpage result database" and "same-source webpage result database"; if an address of webpage in accordance with conditions is found during the updating process, and then selecting and putting into "non-same-source webpage result database" or "same-source webpage result database" depending on whether they have the same-source webpage; and thus, the result will be obtained if another person searches for the same keywords again;

(3) decomposing contents of webpage and objects of hyperlink by "webpage content separator" into the following types of multimedia, picture, text and hyperlink;

(4) generating judgment results by various content decision devices respectively:
  A. generating "SMS (Same Media Score)" contained in the target webpage by "multimedia content decision device";
  B. generating "SPS (Same Photo Score)" contained in the target webpage by "picture content decision device";
  C. generating "STS (Same Text Score)" contained in the target webpage by "text content decision device";
  D. generating "SHS (Same Hyperlink Score)" contained in the target webpage by "hyperlink content decision device";

(5) obtaining respectively "SMP" (same-source multimedia judging power), "SPP" (same-source photo judging power), "STP" (same-source text judging power) and "SHP" (same-source hyperlink judging power) from "same-source webpage judgment rule database" and multiplying them respectively with "SMS", "SPS", "STS" and "SHS" generated in Step (4);

(6) summing up the results of Step (5) to obtain the "SSS" (Same Source Score) of the webpage, wherein SSS= (SMS*SMP)+(SPS*SPP)+(STS*STP)+(SHS*SHP);

(7) judging whether the "SSS" of the webpage exceeds the threshold, if YES, then judging it as "same-source webpage" of other webpage; if NO, then judging it as "non-same-source webpage";

(8) putting the "non-same-source webpage" generated in Step (7) into "non-same-source webpage result database" through "non-same-source webpage processing module"; and putting the "same-source webpage" generated in Step (7) into the "same-source webpage result database" through the "same-source webpage processing module";

(9) generating a static webpage of search results dynamically by the "search result webpage publisher" in accordance with the content of "same-source webpage index database" and "non-same-source webpage index database", publishing them onto the "web server of search engine's search result", and then displaying them to the inquirer via a browser;

(10) displaying the results to the inquirer directly through a browser by using "dynamic webpage web server", for another implementation method of "Step (9)".

2. The composite display method for a search engine of same resource information used for a system for obtaining the degree of attention PageFocus of webpage user necessary as claimed in claim 1, wherein the "same-source information processing module" includes the following steps:

(1) receiving some search keywords from an inquirer, and judging files or services to be required by the software according to the content and syntax of keywords;

(2) judging whether the contents to be searched have already been published on the web server or not, if the search results have been published on the "web server of search engine's search result", then returning directly to the search results, in which the multimedia access ports in accordance with conditions having the same source have been aggregated into one a "title search result"; another webpage including all search results may be picked up on the "web server of search engine's search result" after clicking the "same-source files" button, thereby making the inquirer be able to see all of the search results in accordance with conditions, and then the whole searching process is finished; if no searching objects have been published on the "web server of search engine's search result", and then initiating the step 3;

(3) returning no matching result to the inquirer;

(4) adding the search keywords to next task of updating the "non-same-source information index database" and "same-source information index database", and periodically initiating the updating process of the two databases;

(5) updating processes of the "same-source information index database" and "non same-source information index database", comprising:
  A. searching new target files or service entrances on the webpage by "searcher" and entering into the entrances by the software to obtain the files or services;
  B. judging whether the content of newfound information is the same as that of the current "same-source information index database" by the "content decision device", if "YES", then putting it into the category of the "same-source information index database" as a new element; if "NO", then judging whether it has the same content as that of the current "non-same-source information index database" by the "content decision device";
  C. creating a new category for the current information and the same-source information having been stored in the "non-same-source information index database", and transferring all into the "same-source information index database", if "YES"; if "NO", then creating a new category for the current information, and storing it into the "non-same-source information index database";

(6) generating the static webpage of the search results dynamically by the "search result webpage publisher" according to the content of the "same-source webpage index database" and "non-same-source webpage index database", publishing them onto the "web server of search engine's search results", and then displaying them to the inquirer via a browser;

(7) displaying the results to the inquirer directly through a browser by using "dynamic webpage web server", for another implementation method of "Step (6)".

3. The composite display method for a search engine of same resource information used for a system for obtaining the degree of attention PageFocus of webpage user necessary as claimed in claim 2, wherein processing documents by the "same-source information processing module", the updating process of "same-source information index database" and "non-same-source information index database" comprises:

(1) searching new document files or hyperlink entrances in the webpage by "document searcher", and entering into the entrances by the software to obtain files or services;

(2) judging whether the content of the newfound document is the same as that of the current "same-source document index database" by the "document content decision device" and "picture content decision device"; if "YES", then putting it into the category of "same-source document index database" as a new element; if "NO", then judging whether it has the same content as that of the current "non-same-source document index database" by the "document content decision device";

(3) creating a new category for the current documents and the same-source documents having been stored in the "non-same-source document index database", and transferring all to the "same-source document index database" if "YES"; if "NO", then creating a new category for the current documents, and storing them in the "non-same-source document index database".

4. The composite display method for a search engine of same resource information used for a system for obtaining the degree of attention PageFocus of webpage user necessary as claimed in claim 3, wherein the related "content decision device module" includes the following steps:

(1) receiving "judged objects", which may receiving the multimedia from multiple sources, and recording the quantity of the judged objects as InputQuantity;

(2) finding out the vested comparable property of the judged objects, and recording the quantity of the judged objects having the same value on the current property as SameQuantity;

(3) inputting the "power" value of the current property during the process of judgment as Power;

(4) calculating the anastomosis degree of all "judged objects" on the current property: PSame=SameQuantity*Power;

(5) returning to Step (1) and executing Steps (1)~(4) for next property to obtain the PSame of the property, until obtain the PSames of all properties;

(6) calculating and returning the degree value of the same content of the judged objects: SameMediaPower=the sum of all of PSames/InputQuantity.

5. The composite display method for a search engine of same resource information used for a system for obtaining the degree of attention PageFocus of webpage user necessary as claimed in claim 3, wherein when the content decision device module is "text content decision device", it includes the following steps:

(1) finding out the total length value of same words or sentences in the texts as SameLength;

(2) finding out the length value of the shortest inputted texts in the multiple inputted texts as MinLength;

(3) returning to the value of similarity degree of texts: SameTextPower=SameLength/MinLength.

6. The composite display method for a search engine of same resource information used for a system for obtaining the degree of attention PageFocus of webpage user necessary as claimed in claim 2, wherein when the "content decision device module" is "commercial information content decision device", it includes the following steps:

(1) comparing whether the compared commercial information is the same products or services, if "NO", then returning to "inconsistency", if "YES", then entering into the Step (2);

(2) judging whether the compared commercial information has sensitivity to geography location or not, if "NO", then returning to the judging results of "consistency"; if "YES", then entering into the Step (3);

(3) judging whether the providers of involving in the compared commercial information is located in the same city or region, if "NO", then returning to the judging results of "inconsistency"; if "YES", then returning to the judging results of "consistency".

7. The composite display method for a search engine of same resource information used for a system for obtaining the degree of attention PageFocus of webpage user necessary as claimed in claim 1, wherein when the "content decision device module" is "hyperlink content decision device", it includes the following steps:

(1) receiving the "judged objects", which are URL addresses of multiple hyperlinks;

(2) making statistics to the similarity degree of the "judged objects": SameURLPower=the quantity of URL addresses which have appeared in every group of hyperlinks;

(3) returning to the SameURLPower.

8. The composite display method for a search engine of same resource information used for a system for obtaining the degree of attention PageFocus of webpage user necessary as claimed in claim 1, wherein the implementation method selected by the "title search result" includes the following steps:

(1) calculating the probability of power value (PWn) that every "same-source search result" becomes "title search result" as PWn, $$PWn=TP*\text{PageFocus}/(\text{RespDelay}-K),$$

n: the search result is the n item,
when the (RespDelay−K) is less than or equals to zero, (RespDelay−K) should be 1,
PageFocus: the value of webpage attention degree,
RespDelay: the response delay of webpage service,
K: the constant of service response: the service delay to be less than the constant will not be found, for example, K is set as 50 msec.,
TP: the power of "title search result";

(2) summing up the probability power value (PWn) of the entire original "same-source search result", PWall is the power value of the entire probability;

(3) calculating the probability that every "same source search result" becomes "title search result": Pn=PWn/Pwall;

(4) choosing "title search result" dynamically and randomly with visiting actions of the inquirer according to the probability of Pn value, and displaying it to the inquirer.

9. The composite display method for a search engine of same resource information used for a system for obtaining the degree of attention PageFocus of webpage user necessary as claimed in claim 8, wherein the calculating method for the probability power value (PWn) of "title search result" comprises:

a. $PWn=(TP+\text{PageFocus})/(\text{RespDelay}-K)$, or b. $PWn=(TP+\text{PageFocus})/\text{RespDelay}/K$, or c. $PWn=TP*\text{PageFocus}/\text{RespDelay}/K$.

10. The composite display method for a search engine of same resource information used for a system for obtaining the degree of attention PageFocus of webpage user necessary as claimed in claim 1, wherein the "same-source information processing module"
- A. can be embedded in the search engine;
- B. can be placed between "search engine" and "web server of search engine's search result";
- C. can also be placed between the "search engine" and the searched website as a preconditioning module.

11. The composite display method for a search engine of same resource information used for a system for obtaining the degree of attention PageFocus of webpage user necessary as claimed in claim 1, wherein the button with meanings of opened details or other information can be controls of hyperlink or various software interface.

12. A system for obtaining the degree of attention PageFocus of webpage user necessary for the results generated by the searching method of claim 1, comprising "PageFocus network server" and "PageFocus network browser", wherein:
- (1) "PageFocus network server" includes "ID register server of PageFocus browser", "webpage attention degree statistics server of PageFocusAccServer", "online update server of PageFocus browser" and "data encrypting & decrypting module";
- (2) "PageFocus network browser" comprises "PageFocus browser's ID register module", "PageFocus calculating module";

wherein the working steps are as follows:
- (1) having a worldwide unique ID mark when "PageFocus network browser" is installed, or initiatively searching for "ID register server of PageFocus browser" from a network to get a worldwide unique ID mark when using;
- (2) transforming users' operation for browser and webpage as well as the characteristics of webpage contents into the "PageFocus" of webpage according to the power, and forming "PageFocus data packet" by "PageFocus network browser" having the conventional network browser, then transmitting it to the "PageFocusAccServer" of the search engine in an encryption manner via network protocol;
- (3) accumulating the "PageFocus" score contained in it to the corresponding webpage by "PageFocusAccServer" after receiving the "PageFocus data packet" sent by every global "PageFocus network browser";
- (4) treating the information of "PageFocus" of every global webpage contained in "PageFocusAccServer" in various methods to form the reference of webpage rank by the search engine, the reference of choosing "title search result" from the search results with the same contents, or publishing it directly out as services of "rank of webpage popular degree".

13. The system for obtaining the degree of attention of webpage user as claimed in claim 12, wherein the "PageFocus data packet" can be formed when the browser closes the webpage thoroughly or can be formed periodically, or can be formed when being accumulated to a certain score to reduce the counting press of "PageFocusAccServer".

14. The system for obtaining the degree of attention of webpage user as claimed in claim 12, wherein the PageFocus are formed according to the power listed in the following table:

| Operations of the browser | Power | Comments |
|---|---|---|
| Opening a webpage | 1(or 1.1, 1.3, 1.5) | The user is interested in opening the webpage |
| Staying for less than 10 sec. in an webpage | −10(or 7, 8, 9) | A disgusting webpage |
| Staying for less than 30 sec. in an webpage | −3(or −5, −4, −2) | Without interest or very simple content. |
| Staying for less than 1 min in an webpage | −1(or −3, −2, −1.5) | Without interest or very simple content. |
| Staying for more than 1 min in an webpage | 3(or 1, 2, 5) | A common webpage browse |
| Staying for more than 5 min in an webpage | 5(or 3, 4, 5) | A more serious webpage browse |
| Speed of reading words | 100/speed of reading words | 1. "Speed of reading words" can be calculated by judging user's operating scope and frequency for keyboard, mouse wheel and "drag of scroll bar" as well as the font size of the webpage contents; 2. "Speed of reading words" = quantity of scrolled text/time interval of scrolling; 3. Unit of "speed of reading words" is words/sec.; 4. Note: reading at 100 words/1 sec. means careless, then gain 1 point; reading at1 word/1 sec. means very careful, then gain 100 points. |
| The picture of the webpage is clicked, but the hyperlink of the picture points to another picture. | 3(or 1, 2, 4) | It means the picture may provide a "larger picture", and it may be the main content of the webpage, and the user's clicking means he/she wants to look at the larger one carefully. |
| The picture of the webpage is clicked, but the hyperlink of the picture points to another webpage of the same website. | 1(or0.1, 0.2, 0.9) | It may be an advertisement picture. |
| The picture of the webpage is clicked, but the hyperlink of the picture points to anther webpage of another website. | 0(or0.1, 0.2, 0.3) | It may be an advertisement picture. |
| The hyperlink of the webpage is clicked, but the target is in the same directory with the current page. | 2(or 0.5, 1, 2.5) | It may be a serial webpage of the same article, both of the current webpage and the target webpage pointed by the clicked hyperlink can obtain scores of the "power", e.g.: "http:/www.yoogol.com/news/01.htm" and "http:/www.yoogol.com/news/02.htm" |

| Operations of the browser | Power | Comments |
| --- | --- | --- |
| The hyperlink of webpage is clicked, but the target is a webpage of another website. | 0(or−0.5, −0.3, −0.1) | There is nothing to do with the current webpage. |
| The webpage content contains the words with the titles having the meaning of sequence numbers, such as: "1 2 3 4", and the target points to the hyperlink of webpage with the same URL directory. | N | The current webpage and the webpage with the title having the meaning of sequence numbers, such as: "1 2 3 4", and the webpage of its target pointing at the same URL directory are usually the pagination display of the same article; scores of any page of the article (including negative score) is the same as that of other pages, even if they have not been opened. |
| Using browsers by users and clicking a menu of the right key of mouse and voting: "voting −10 points" | PageFocus * 0% | 1. Using a menu of the right key of mouse for any parts of webpage in the browser, there are some menu options such as "Voting 10 points", "Voting 5 points", "Voting 1 point", "Voting −1 point", "Voting −5 points", and "Voting −10 points". |
| Using browsers by users and clicking a menu of the right key of mouse and voting: "Voting −5 points" | PageFocus * 10% | |
| Using browsers by users and clicking a menu of the right key of mouse and voting: "Voting −1 point" | PageFocus * 50% | 2. When the menu of the right key is used by users to vote the background of the current webpage, the score of PageFocus = the score of PageFocus of the current webpage * power |
| Using browsers by users and clicking a menu of the right key of mouse and voting: "Voting 10 points" | PageFocus * 10 | 3. When the menu of the right key is used by users to vote various elements of the current webpage, the score of PageFocus of webpage pointed by the hyperlink of the element = the score of PageFocus of the current webpage * power. |
| Using browsers by users and clicking a menu of the right key of mouse and voting: "Voting 5 points" | PageFocus * 5 | |
| Using browsers by users and clicking a menu of the right key of mouse and voting: "Voting 1 point" | PageFocus * 1 | |

15. The system for obtaining the degree of attention of webpage user as claimed in claim 12, wherein the "PageFocus data packet" includes the score fields of "PageFocus browser ID", "WebPage URL" and "PageFocus".

16. The system for obtaining the degree of attention of webpage user as claimed in claim 12, wherein,
when every webpage having "same-source webpage" involves in the process of providing the webpage rank by the search engine, the sum of PageFocus of every "same-source webpage" can be used as the basis of rank, that is, A. when the "title search result" of "same-source webpage" involves in the result rank of the search engine, the sum of PageFocus of every "same-source webpage" can be used as the basis of rank; B. when every webpage in the "same-source webpage" involves in the result rank of the search engine, the sum of PageFocus of every webpage in the affiliated "same-source webpage" can be used as the basis of rank.

* * * * *